US007615257B2

(12) United States Patent  
Jung et al.

(10) Patent No.: US 7,615,257 B2
(45) Date of Patent: Nov. 10, 2009

(54) METHOD FOR PRETREATING AND/OR COATING METALLIC SURFACES WITH A PAINT-LIKE COATING PRIOR TO FORMING AND USE OF SUBSTRATES COATED IN THIS WAY

(75) Inventors: Christian Jung, Oberhaid (DE); Toshiaki Shimakura, Fchikawa (JP); Norbert Maurus, Langen (DE); Heribert Domes, Weilmunster (DE); Hardy Wietzoreck, Frankfurt am Main (DE); Klaus Bittner, Frankfurt am Main (DE); Thomas Kolberg, Heppenheim (DE); Marcus Schinzel, Eppstein (DE)

(73) Assignee: Chemetall GmbH, Frankfurt am Main (DE)

( * ) Notice: Subject to any disclaimer, the term of this patent is extended or adjusted under 35 U.S.C. 154(b) by 472 days.

(21) Appl. No.: 10/362,403

(22) PCT Filed: Oct. 10, 2001

(86) PCT No.: PCT/EP01/11737

§ 371 (c)(1),
(2), (4) Date: Sep. 9, 2003

(87) PCT Pub. No.: WO02/31064

PCT Pub. Date: Apr. 18, 2002

(65) Prior Publication Data

US 2004/0062873 A1  Apr. 1, 2004

(30) Foreign Application Priority Data

| Oct. 11, 2000 | (DE) | ................................ 100 50 537 |
| Mar. 6, 2001 | (DE) | ................................ 101 10 830 |
| Apr. 21, 2001 | (DE) | ................................ 101 19 606 |
| Jun. 7, 2001 | (DE) | ................................ 101 27 721 |

(51) Int. Cl.
*B05D 3/02* (2006.01)
*B05D 3/06* (2006.01)

(52) U.S. Cl. ........................ 427/508; 427/402; 427/409; 427/410

(58) Field of Classification Search ........................ None
See application file for complete search history.

(56) References Cited

U.S. PATENT DOCUMENTS

| 4,548,868 A | 10/1985 | Yonezawa et al. |
| 4,690,837 A | 9/1987 | Doroszkowski et al. |
| 5,089,064 A | 2/1992 | Reghi |
| 5,700,523 A | 12/1997 | Rivera et al. |
| 5,905,105 A | 5/1999 | Rivera et al. |
| 6,875,479 B2 * | 4/2005 | Jung et al. .................. 427/493 |

FOREIGN PATENT DOCUMENTS

| DE | 198 14 605 A1 | 10/1999 |
| EP | 0 344 717 A2 | 12/1989 |
| EP | 0 551 568 A2 | 7/1993 |
| EP | 0 608 107 B1 | 7/1994 |
| JP | 02-235973 | 9/1990 |
| JP | 05-255587 | 10/1993 |
| JP | 07-252433 | 10/1995 |
| WO | WO-00/39224 | 7/2000 |

* cited by examiner

*Primary Examiner*—Monique R Jackson
(74) *Attorney, Agent, or Firm*—Fulbright & Jaworski L.L.P.

(57) ABSTRACT

The invention relates to a method for coating a metallic strip. The strip or optionally, the strip sections produced from said strip in the subsequent process, is/are first coated with at least one anticorrosion layer—according to an alternative form of embodiment, this can be left out—and then with at least one layer of a paint-like coating containing polymers. After being coated with at least one anticorrosion layer or after being coated with at least one layer of a paint-like coating, the strip is divided into strip sections. The coated strip sections are then formed, joined and/or coated with at least one (other) paint-like coating and/or paint coating. The paint-like coating is formed by coating the surface with an aqueous dispersion containing the following in addition to water: a) at least one organic film former containing at least one water-soluble or water-dispersed polymer with an acid value of 5 to 200; b) at least one inorganic compound in particle form with an average particle diameter measured on a scanning electron microscope of 0.005 to 0.3 µm; and c) at least one lubricant and/or at least one corrosion inhibitor. The metallic surface that is optionally coated with at least one anticorrosion layer is brought into contact with the aqueous composition and a film containing particles is formed on the metallic surface, this film then being dried and optionally also hardened, the dried and optionally, also hardened film having a layer thickness of 0.01 to 10 µm. The invention also relates to a corresponding aqueous composition.

77 Claims, No Drawings

METHOD FOR PRETREATING AND/OR COATING METALLIC SURFACES WITH A PAINT-LIKE COATING PRIOR TO FORMING AND USE OF SUBSTRATES COATED IN THIS WAY

The invention relates to a method of coating metallic surfaces and also to the use of the coated substrates produced by the method of the invention in particular in vehicle construction, especially in the line manufacture of automobiles, and for the production of components or bodywork parts or premounted elements in the vehicle, air travel or space travel industry. It relates in particular to new possibilities for the preparation and assembly of motor vehicles which no longer involve the current standard practice of assembling the various parts of the body, cleaning and phosphating them and only then painting them with the paint system as a whole.

There is a need for even greater rationalization of the manufacture of vehicle bodies and their individual parts and also of paneling for vehicles and aircraft.

The anticorrosion layer(s) ought to be readily formable together with the paint or a paintlike layer and ought also to exhibit, after forming, effective corrosion protection and effective paint adhesion. Additionally, depending on the joining technique, it may be necessary for said layer(s) to be readily clinchable as well without showing a greater tendency toward corrosion as a result.

For producing paint-coated metal sheets there are already methods similar to the production methods for metal sheets precoated on the strip, which are used for household appliances, metal architectural panels, and furniture. The requirements imposed on these sheets, however, are much less stringent than the requirements in particular in automobile engineering and aircraft construction. This is because the requirements in the vehicle, air travel or space industry in terms of the strength of the coated sheets, the joining technologies, the paint system, and the properties of the paint layers, such as brightness, gloss, corrosion resistance, scratch resistance, paint adhesion, and stonechip resistance, are markedly different and influence the complex manufacturing process. The high-grade properties of these sheets must still be sufficiently high in the region of the formed and joined portions in particular. Normally, the same exacting requirements as those imposed at present are imposed on a different manufacturing process and a different layer structure, even when individual layers are thinner than 4 µm. The composition of the coating used for this purpose, comprising polymers and particles, is also novel, to the knowledge of the applicant.

The basecoat for metal architectural panels on the outside presently often contains chromate, in order to provide increased corrosion resistance at a relatively low layer thickness; applied to the basecoat there is normally a topcoat with a thickness in the range from 10 to 20 µm. The same or similar basecoats as on the facing side are often applied to the inside of metal architectural panels, as a reverse-face coating, with a thickness in the range from 6 to 15 µm, as a single paint layer. To date, however, to the knowledge of the applicant, there has been no use of UV-cured paint materials in the coating of strips in the household appliance and architectural segments.

The strip line which is utilized in each case may be a galvanizing line, a coil coating line and/or another kind of coating line, such as, for example, a painting line in, for example, an automobile plant, on which cut strip which has been pretreated beforehand on a strip line is painted with a paint and/or with a paintlike coating.

By prephosphating is meant a temporary protection of metallic surfaces, it being possible for the substrates thus coated to be subsequently subjected, where appropriate, to oiling, temporary storage, forming, joining (after deoiling) by clinching, adhesive bonding and/or welding, for example, and/or pretreated again with phosphate, for example, before the paint system is applied.

Pretreatment prior to painting is nowadays carried out, particularly in the European automobile industry, sometimes without deliberate addition of chromium and sometimes with addition of chromium. In principle, however, it is preferred to operate without chromium or substantially without chromium, in particular without chromium to the extent that no chromium is deliberately added, in order to avoid this toxic heavy metal. Nevertheless, the addition of chromium has a particular corrosion protection effect, given that a self-healing effect may come about at a site which has been damaged. The pretreatment solutions are preferably also free from or contain low levels in each case of cobalt, copper, nickel and/or other heavy metals. Amounts of nickel in particular, however, are still particularly advantageous and are therefore virtually always present in phosphate coats, for example. The pretreatment solutions can be applied either by the rinse method or by the no-rinse method. In the case of the rinse method, the application of the solution, which can take place in particular by spraying and/or dipping and during which the pretreatment layer is formed, is followed by rinsing. In the case of the no-rinse method, the solution is applied with a roll coater, for example, and is dried immediately without rinsing.

By a basecoat is meant a paint or a paintlike coating which replaces the cathodic dip coat (electrocoat) that is commonly used in bodywork construction. It may be a primer, in particular a lubricant primer, welding primer or pretreatment primer, or another kind of coating, based for example on silane/siloxane. When necessary, an intermediate paint layer may be applied between the basecoat and the surfacer (i.e., color coating). The surfacer is normally followed by at least one clearcoat, which intensifies the brightness and is also referred to as the topcoat.

The coating which is developed with a lubricant primer can be formed very effectively and easily owing to the good slip properties, its low friction, and its flexibility. A welding primer and the coating produced from it includes such a high fraction of electrically conductive substance, in particular of electrically conductive particles, that two metal sheets can be welded together without substantially increased effort even when this involves contacting through two paintlike coats. A pretreatment primer is a primer or a corresponding coating which may also replace the corrosion protection properties of a pretreatment layer. All of these are paintlike coatings.

The invention further relates to a method of coating metallic surfaces with an aqueous composition comprising polymer and fine inorganic particles. The invention additionally relates to such an aqueous composition and also to the use of the substrates coated by the method of the invention.

The processes used most frequently to date for the surface treatment or pretreatment prior to painting of metals, particularly of metal strip, are based on the use of chromium(VI) compounds together with diverse additives. Owing to the toxicological and environmental risks which such processes entail and, moreover, owing to the foreseeable statutory restrictions on the use of chromate-containing processes, the search has been on for some time already for alternatives to these processes in all fields of metal surface treatment.

Resin mixtures are known for which resins are blended with inorganic acids in order thus to obtain a pickling attack as well and hence a better contact of the resin coat directly with the metallic surface. These compositions have the drawback that, owing to the pickling attack, contamination occurs during the contacting of the treatment liquid (dispersion) to the substrate. This leads to the accumulation of metals in the treatment liquid and, as a result, to a permanent change in the chemical composition of the treatment liquid, thereby significantly impairing the corrosion protection. These metals are dissolved by the pickling attack out of the metallic surface of the substrate to be treated.

Another drawback is that, especially in the case of aluminum and aluminum-containing alloys, the surfaces darken, discoloring in certain circumstances to a dark gray to anthracite color. The darkened metal surfaces cannot be used for decorative applications, since the discoloration is undesirable on esthetic grounds alone. Depending on the thickness of the applied layer, the darkening is visible with varying intensity.

The object was therefore to overcome the drawbacks of the prior art and in particular to propose a method of coating metallic surfaces which is also suitable for high coating speeds, such as are used for strips; which can be employed substantially or entirely free from chromium(VI) compounds; which as far as possible is also free from organic and inorganic acids; and which can be employed industrially.

It is an object of the invention to propose a method of coating metallic substrates which are also suitable for the coating of strips running at speed and with which it is possible to apply organic, sufficiently flexible, and at the same time sufficiently corrosion-resistant coatings, which allow the production of a basecoat and, where appropriate, of the subsequent layers as well. This method ought to be suitable for economic and very environmentally friendly industrial implementation.

A further object was to propose a method for producing parts, in particular for the assembly of automobile bodies, with which it is possible to perform a longer part of the manufacturing operation of the parts, where appropriate still in the form of a strip, than was hitherto the case in a strip line.

The object is achieved by a method of coating a metallic strip, the strip, or where appropriate strip sections produced from it, in the subsequent operation, being first coated with at least one anticorrosion layer and then with at least one layer of a paintlike, polymer-containing layer, the strip, after coating with at least one anticorrosion layer or after coating with at least one layer of a paintlike coating, being divided into strip sections, the coated strip sections then being formed, joined and/or coated with at least one (further) paintlike layer and/or paint layer, the paintlike coating being formed by coating the surface with an aqueous dispersion which comprises besides water a) at least one organic film former comprising at least one water-soluble or water-dispersed polymer having an acid number in the range from 5 to 200, b) at least one inorganic compound in particle form, having an average particle diameter, measured in a scanning electron microscope, in the range from 0.005 up to 0.3 µm diameter, and c) at least one lubricant and/or at least one corrosion inhibitor, the metallic surface coated with at least one anticorrosion layer being contacted with the aqueous composition and a particle-containing film being formed on the metallic surface, and subsequently dried and, as the case may be, additionally cured, the dried and, as the case may be, additionally cured film having a thickness in the range from 0.01 to 10 µm.

The object is further achieved by a method of coating a metallic strip, the strip being coated with at least one layer of a paintlike, polymer-containing coat without an anticorrosion layer being applied beforehand, the strip, after coating with at least one layer of a paintlike coating, being divided into strip sections, the coated strip sections then being formed, joined and/or coated with at least one (further) paintlike layer and/or paint layer, the paintlike coating being formed by coating the surface with an aqueous dispersion which comprises besides water a) at least one organic film former comprising at least one water-soluble or water-dispersed polymer having an acid number in the range from 5 to 200, b) at least one inorganic compound in particle form, having an average particle diameter, measured in a scanning electron microscope, in the range from 0.005 up to 0.3 µm diameter, and c) at least one lubricant and/or at least one corrosion inhibitor, the clean metallic surface being contacted with the aqueous composition and a particle-containing film being formed on the metallic surface, and subsequently dried and, as the case may be, additionally cured, the dried and, as the case may be, additionally cured film having a thickness in the range from 0.01 to 10 µm.

The surfaces coated in these methods are metallic surfaces in particular of aluminum, iron, copper, magnesium, nickel, titanium, tin, zinc or alloys of aluminum, iron, copper, magnesium, nickel, titanium, tin and/or zinc. The aqueous composition used may in this case be substantially or entirely free from chromium(VI) compounds. It may serve for pretreatment prior to a further coating, such as painting, for example, or for the treatment wherein the element to be coated, where appropriate—in particular a strip or strip section—is formed after coating. In particular, however, the intention is that it should serve to form a first and/or second paintlike coating.

In addition to the abovementioned constituents it may comprise where appropriate at least one organic solvent, where appropriate at least one silane and/or siloxane calculated as silane, where appropriate at least one crosslinking agent based in particular on a basic compound, and where appropriate at least one chromium(VI) compound.

The thickness of the dried and, where appropriate, also cured film can be determined by detaching a defined area of the film and weighing it.

The dried and, where appropriate, also cured film preferably has a pendulum hardness of from 30 to 190 s, preferably from 50 to 180 s, measured with a König pendulum hardness tester in accordance with DIN 53157. The König pendulum hardness is situated preferably in the range from 60 to 150 s, more preferably in the range from 80 to 120 s. In the case of UV-crosslinkable coatings figures in the range of from 100 to 150 s often appear for the pendulum hardness, while in the case of the non-UV-crosslinkable coatings or coatings based on polymer dispersions which undergo little or no chemical crosslinking, for example, it is possible preferentially for pendulum hardness figures in the range from 40 to 80 s to appear. The layers produced in accordance with the invention are to be tested only on test specimens having chemically uniform but sufficiently thick layers, but not on thin coatings in the range up to 10 µm in thickness.

The dried and, where appropriate, also cured film preferably has a flexibility such that bending over a conical mandrel in a mandrel bending test very substantially in accordance with the DIN ISO 6860 for a mandrel of from 3.2 mm to 38 mm in diameter, but without scoring of the test area, does not produce any cracks longer than 2 mm which are perceptible on subsequent wetting with copper sulfate as a result of color change due to deposition of copper on the cracked metallic surface. Demonstration of the flexibility by using the mandrel bending test and subsequently immersing the regions subjected to forming in this way in a copper sulfate solution to visualize defects ensures a reproducible test result and has the advantage that it does not necessitate any laborious corrosion tests, lasting for example for 240 hours, which in some cases, depending on chemical composition and roughness of the metallic surface, can lead to different results which are therefore of only limited comparability with one another. In the case of relatively base-metallic surfaces such as in the case of aluminum alloys it is necessary for this test first to clean the metallic surface by pickling prior to coating in order very substantially to remove the oxide layer.

Inventive Composition for Developing a Treatment Layer or Pretreatment Layer and/or a Paintlike Coating:

The aqueous composition is preferably free from inorganic acids and/or from organic carboxylic acids, especially free from inorganic acids.

The organic film former is present in the aqueous composition (bath solution) preferably in an amount of from 0.1 to 1000 g/L, more preferably in a range from 2 to 600 g/L, very preferably from 50 to 550 g/L, in particular from 150 to 450 g/L. It is preferred to add from 2 to 100 parts of the organic film former per 100 parts by weight of water, more preferably from 10 to 60 parts, very preferably from 15 to 45 parts. The highest levels of organic film former may occur in particular in the case of UV-curing systems with few or no volatile fractions such as organic solvents and/or residual monomers. Particularly preferred for the method of the invention are coatings which film predominantly or solely on drying, or thermally-physically cured coatings.

The at least one inorganic compound in particle form is present in the aqueous composition (bath solution) preferably in an amount of from 0.1 to 500 g/L, more preferably in a range from 10 to 200 g/L, very preferably from 30 to 100 g/L. It is preferred to add from 0.1 to 50 parts of the at least one inorganic compound in particle form per 100 parts by weight of water, more preferably from 0.5 to 20 parts, very preferably from 0.8 to 10 parts. Among the inorganic compounds in particle form particular preference is given to those which maintain the transparency of the coating of the invention, i.e. which are colorless or white, such as alumina, barium sulfate, silicate, silica, colloidal silica, zinc oxide and/or zirconium oxide, for example, in order to keep the visual character of the metallic surface visible as far as possible without corruption.

The ratio of the amounts of organic film former to amount of inorganic compounds in particle form in the aqueous composition (bath solution) can vary within wide ranges; in particular, it can be $\geq$ 25:1. This ratio is preferably situated within a range from 0.05:1 to 15:1, more preferably within a range from 1:1 to 8:1.

The amount of at least one silane and/or siloxane calculated as silane in the aqueous composition (bath solution) is preferably from 0.1 to 50 g/L, more preferably from 0.2 to 35 g/L, very preferably from 0.5 to 20 g/L, in particular from 1 to 10 g/L.

For a concentrate for making up the bath solution primarily by dilution with water, or for a top-up solution for standardizing the bath solution when a bath is operated for prolonged periods, it is preferred to use aqueous compositions which contains the majority or almost all of the constituents of the bath solution, but not the at least one inorganic compound in particle form, which is preferably held separate and added separately. In addition, reaction accelerants and drying accelerants such as, for example, the morpholine salt of paratoluenesulfonic acid can be added separately, especially for curing in the case of polyester-melamine resin systems. The concentrate and the top-up solution, respectively, preferably have a concentration which in terms of the individual constituents is from five times to ten times the levels in the bath solution. In some cases, however, it is also possible to operate with the "concentrate" directly as bath solution, where appropriate after slight dilution by from 5 to 30%, for example.

The aqueous composition, which is preferably substantially free of chromium(VI) compounds, has a chromium content of only up to 0.05% by weight on chromium-free metallic surfaces and only up to 0.2% by weight on chromium-containing metallic surfaces. Preferably, no chromium is added deliberately to the solution or dispersion. Amounts of chromium occurring in the bath can then have been dissolved out of the metallic surface by pickling attack, can originate or have been entrained in traces from contaminants, from upstream baths, and/or can come from vessels and pipelines. Preferably, amounts of cadmium, nickel, cobalt and/or copper are also kept extremely low, and are not added. Normally, however, for the solutions and dispersions of the invention, the pickling attack is so slight that it is not possible for any steel additives such as chromium or nickel, for example, to be dissolved out of a steel surface.

In the case of the method of the invention the organic film former can be present in the form of a solution, dispersion, emulsion, microemulsion and/or suspension. The term "dispersion" here encompasses the subsidiary concepts of emulsion, microemulsion, and suspension. The organic film former may be or comprise at least one synthetic resin, especially a synthetic resin based on acrylate, butadiene, ethylene, polyester, polyurethane, silicone polyester, epoxide, phenol, styrene, urea-formaldehyde, mixtures thereof and/or addition copolymers thereof. The system in question may be a cationically, anionically and/or sterically stabilized synthetic resin or polymer and/or solution thereof.

The organic film former is preferably a synthetic resin mixture and/or an addition copolymer which includes synthetic resin based on acrylate, epoxide, ethylene, urea-formaldehyde, phenol, polyester, polyurethane, styrene and/or styrene-butadiene, and from which, during or after the emission of water and other volatile constituents, an organic film is formed. The organic film former may comprise synthetic resin and/or polymer based on epoxide, phenol, polyacrylate, polyethyleneimine, polyurethane, polyvinyl alcohol, polyvinylphenol, polyvinylpyrrolidone, polyaspartic acid and/or derivatives thereof and/or copolymers, particularly copolymers with a phosphorus-containing vinyl compound.

Very particular preference is given to a synthetic resin based on acrylate or based on ethylene-acrylic acid with a melting point in the range from 60 to 95° C. or to a synthetic resin having a melting point in the range from 20 to 160° C., in particular in the range from 60 to 120° C.

The acid number of the synthetic resin/synthetic resin mixture may lie preferably in the range from 10 to 140, more preferably in the range from 15 to 100, very preferably in the range from 20 to 80. Within a high acid number range it is normally not necessary to stabilize a film former cationically, anionically and/or sterically. In the case of a low acid number, however, such stabilization is generally necessary. In that case it is advantageous to use synthetic resins which have already been stabilized, or mixtures thereof.

The molecular weight of the synthetic resin or the polymer may lie within the range from at least 1000 u, preferably from 5000 to 250 000 u, more preferably in the range from 20 000 to 200 000 u.

In the case of the method of the invention, the pH of the aqueous solution of the organic film former without the addition of further compounds may lie preferably in the range from 0.5 to 12, more preferably in the range from 1 to 6 or from 6 to 10.5, very preferably in the range from 1.5 to 4 or from 7 to 9, depending on whether the method is carried out in the acidic or rather the basic range. In this context it should be borne in mind that the synthetic resins have often already been neutralized at the premises of the synthetic resin manufacturer. Preferably, the pH of the organic film former alone in an aqueous formulation, without addition of further compounds, is in the range from 1 to 12. If, however, the pH should have dropped as a result of storage of the synthetic resins or of the mixtures, it can be useful to return the pH, in particular of the otherwise ready-to-use solution/dispersion, to a more alkaline range by means, for example, of adding sodium hydroxide solution.

The composition of the organic film former may also be such that it contains (only) water-soluble synthetic resin and/or polymer, especially resin and/or polymer stable in solutions with pH values $\leq 5$.

The organic film former preferably contains (only) synthetic resin and/or polymer containing carboxyl groups. The carboxyl groups can be neutralized, inter alia, by ammonia, amines—especially alkanolamines—and/or alkali metal compounds and can be reacted to give an aqueous solution with a readily water-dilutable synthetic resin, which beforehand under standard conditions is not soluble in water. For crosslinking the carboxyl-containing synthetic resins it is advantageous to add melamine-formaldehyde for chemical crosslinking.

In the case of the method of the invention it can be preferable for the aqueous composition to comprise at least one partly hydrolyzed or fully hydrolyzed silane and/or at least one siloxane. This then offers the advantage that adhesion bridges are produced between the substrate and the dried protective film and also to plastics coatings and/or paint layers possibly applied subsequently, so also achieving improved paint adhesion. A further advantage is that appropriate silanes/siloxanes produce adhesion-bridgelike crosslinks within the dried protective film which substantially enhance the strength and/or flexibility of the coating system and also the adhesion to the substrate, thereby achieving improved adhesion in the case of many paint systems. In the case of the method of the invention it can be preferable for the aqueous composition to comprise at least one partly hydrolyzed or fully hydrolyzed silane. This then offers the advantage that, in the case of many paint systems, improved adhesion is obtained. The silane may be an acyloxysilane, an alkylsilane, an alkyltrialkoxysilane, an aminosilane, an aminoalkylsilane, an aminopropyltrialkoxysilane, a bis-silyl-silane, an epoxysilane, a fluoroalkylsilane, a glycidyloxysilane such as, for example, a glycidyloxyalkyltrialkoxysilane, an isocyanatosilane, a mercaptosilane, a (meth)acrylatosilane, a mono-silyl-silane, a multi-silyl-silane, a bis(trialkoxysilyl-proyl)amine, a bis(trialkoxysilyl)-ethane, a sulfur-containing silane, a bis(trialkoxy-silyl)propyltetrasulfane, a ureidosilane such as, for example, a (ureidopropyltrialkoxy)silane and/or a vinylsilane, in particular a vinyltrialkoxysilane and/or a vinyltriacetoxysilane. It can be, for example, at least one silane in a mixture with an amount of at least one alcohol such as ethanol, methanol and/or propanol of up to 8% by weight based on the silane content, preferably up to 5% by weight, more preferably up to 1% by weight, very preferably up to 0.5% by weight, where appropriate with an amount of inorganic particles, in particular in a mixture of at least one aminosilane such as, for example, bis-amino-silane with at least one alkoxysilane such as, for example, trialkoxysilyl-propyltetrasulfane or a vinylsilane and a bis-silyl-aminosilane or a bis-silyl-polysulfursilane and/or a bis-silyl-aminosilane or an aminosilane and a multi-silyl-functional silane. The aqueous composition can in that case also, alternatively or additionally, contain at least one siloxane corresponding to the abovementioned silanes. Preference is given to those silanes/siloxanes which have a chain length in the range from 2 to 5 carbon atoms and contain a functional group which is suitable for reaction with polymers. The addition of at least one silane and/or siloxane may be advantageous for the purpose of developing adhesion bridges or for promoting crosslinking.

In the case of the method of the invention the inorganic compound in particle form that is added is a finely divided powder, a dispersion or a suspension, such as, for example, a carbonate, an oxide, a silicate or a sulfate, especially colloidal and/or amorphous particles. With particular preference the inorganic compound in particle form comprises particles based on at least one compound of aluminum, of barium, of cerium, of calcium, of lanthanum, of silicon, of titanium, of yttrium, of zinc and/or of zirconium, especially particles based on alumina, barium sulfate, cerium dioxide, silica, silicate, titanium oxide, yttrium oxide, zinc oxide and/or zirconium oxide. As organic compound in particle form it is preferred to use particles having an average size in the range from 6 nm to 200 nm, more preferably in the range from 7 to 150 nm, very preferably in the range from 8 to 90 nm, more preferably still in the range from 8 to 60 nm, most preferably in the range from 10 to 25 nm. These particles may also be present in the form of gel or sol. The particles may, for example, have been alkali-stabilized in order to obtain better dispersion. An addition of boron for dispersing the inorganic compound in particle form was not necessary and has also not been used in the examples. It is preferred for relatively large particles to have a more platelet-shaped or elongate grain morphology.

In the case of the method of the invention it is also possible to add at least one organic solvent. As organic solvent for the organic polymers it is possible to use at least one water-miscible and/or water-soluble alcohol, a glycol ether or N-methylpyrrolidone and/or water—in the case of the use of a solvent mixture, a mixture in particular of at least one long-chain alcohol, such as propylene glycol, an ester alcohol, a glycol ether and/or butanediol with water. In many cases, however, it is preferred to add only water, without any organic solvent. The amount of organic solvent is preferably from 0.1 to 10% by weight, in particular from 0.25 to 5% by weight, very preferably from 0.4 to 3% by weight. For strip production it is preferable to use only water and no organic solvent, apart possibly from small amounts of alcohol.

In the case of the method of the invention it is possible to add as a lubricant, which may also serve as a forming agent, at least one wax selected from the group consisting of paraffins, polyethylenes, and polypropylenes, especially an oxidized wax. It is particularly advantageous to employ the wax as an aqueous or as a cationically, anionically and/or sterically stabilized dispersion, since it can then easily be held homogeneously distributed in the aqueous composition. The melting point of the wax used as lubricant is preferably in the range from 40 to 165° C., more preferably in the range from 50 to 160° C., in particular in the range from 120 to 150° C. In addition to a lubricant having a melting point in the range from 120 to 165° C. it is especially advantageous to add a lubricant having a melting point in the range from 45 to 95° C. or having a glass transition temperature in the range from −20 to +60° C., particularly in amounts of from 2 to 30% by weight, preferably from 5 to 20% by weight, of the overall solids content. Such a lubricant may also be used with advantage on its own. The at least one lubricant which may also at the same time be a forming agent is preferably present in the aqueous composition in an amount in the range from 0.1 to 25 g/L and with particular preference in an amount in the range from 1 to 15 g/L. The presence of wax is only advantageous, however, if the coating of the invention is a treatment layer, since in a pretreatment layer the presence of wax may be deleterious for the painting operation. A lubricant and/or forming agent can be added in order to reduce the friction coefficient of the coating, especially during forming. The substances recommended for this purpose include paraffin, polyethylene, and oxidized polyethylene.

The acid groups of the synthetic resin and/or of the polymer may have been neutralized with ammonia, with amines—especially alkanolamines—such as, for example, morpholine, dimethylethanolamine, diethylethanolamine, or triethanolamine and/or with alkali metal compounds such as sodium hydroxide, for example.

The inventive solution or dispersion for coating may comprise at least one corrosion inhibitor, especially based on amine(s). The corrosion inhibitor may contain at least one organic group and/or at least one amino group. It may be an organic compound or an ammonium compound, in particular an amine or an amino compound, such as, for example, comprise a TPA-amine complex, a phosphonate, a polyaspartic acid, a thiourea, a Zr ammonium carbonate, benzotriazole, a tannin, an electrically conductive polymer such as a polyaniline, for example, and/or derivatives thereof. This inhibitor may be at least one alkanolamine, preferably a long-chain alkanolamine, and/or at least one thiol. It is preferably not readily volatile at room temperature. Further, it may be advantageous if it is readily soluble in water and/or readily dispersible in water, in particular at more than 20 g/L. Particular preference is given inter alia to alkylaminoethanols such as dimethylaminoethanol or to complexes based on a TPA amine such as N-ethylmorpholine complex with 4-methyl-γ-oxo-benzynebutanoic acid. This corrosion inhibitor can be added in order to bring about a relatively robust inhibition of corrosion or to reinforce corrosion inhibition still further. It is particularly advantageous if ungalvanized steel surfaces, especially cold-rolled steel (CRS), are to be coated. It is preferably present in the aqueous composition in an amount in the range from 0.1 to 50 g/L and more preferably in an amount in the range from 1 to 20 g/L or, preferably, in an amount in the range from 0.01 to 5 parts by weight, more preferably in the range from 0.03 to 2 parts by weight, very preferably in the range from 0.05 to 1.2 parts by weight, based on 100 parts by weight of water.

The ratio of the amounts of organic film former to amounts of lubricant in the aqueous composition (bath solution) can vary within wide limits; in particular it can be [3] 2:1. Preferably this ratio lies within a range from 3:1 to 50:1, more preferably within a range from 10:1 to 20:1.

The ratio of the amounts of organic film former to amounts of at least one corrosion inhibitor in the aqueous composition (bath solution) can vary within wide ranges; in particular it can be [2] 500:1. Preferably this ratio is situated within a range from 5:1 to 400:1, more preferably within a range from 10:1 to 100:1.

The aqueous composition of the invention is preferably free from addition of free fluoride, of complex fluoride such as hexafluorotitanic acid or hexafluorozirconic acid, for example, and/or of fluoride bound in other ways.

Particularly advantageous compositions of the invention include at least one copolymer based for example on acrylic-polyester-polyurethane, styrene and/or ethylene-acrylic as film formers, at least one inorganic compound in particle form based in particular on alumina, aluminum phosphite, iron oxide, iron phosphite, mica, lanthanide oxide(s) based for example on cerium oxide, molybdenum sulfide, graphite, carbon black, silicate, silica, colloidal silica, zinc oxide and/or zirconium oxide, at least one crosslinking agent, at least one corrosion inhibitor and, where appropriate, further additions such as, inter alia, at least one silane/polysiloxane. The particles having a relatively high or high electrical conductivity may for application for welding also be selected such that they have an average particle size such that they protrude somewhat more, where appropriate, from the layer of the invention.

The inventive solution or dispersion for coating may comprise at least one crosslinking agent based in particular on a basic compound in order to produce resistance to aggressive media such as chemicals and effects of weathering and also to mechanical stresses and in order to ensure color stability particularly in the case of aluminum and aluminum-containing surfaces in conditions of high atmospheric humidity or wet-room exposure and to prevent darkening. Particularly advantageous crosslinking agents are those based on titanium, hafnium and/or zirconium and those based on carbonate or ammonium carbonate, especially based on titanium and/or zirconium. It is preferably present in the aqueous composition in an amount in the range from 0.1 to 30 g/L and more preferably in an amount in the range from 1 to 10 g/L or, preferably, in an amount in the range from 0.01 to 3 parts by weight, more preferably in the range from 0.1 to 1 parts by weight, very preferably in the range from 0.2 to 0.6 parts by weight, based on 100 parts by weight of water.

Moreover it is advantageous to add at least one wetting agent in order to allow the wet film to be applied uniformly in its areal extent and in its layer thickness and also imperviously and without defects. In principle, numerous wetting agents are suitable for this purpose, preferably acrylates, silanes, polysiloxanes, long-chain alcohols, which lower the surface tension of the aqueous composition. In many cases it will be necessary to add a defoamer. For better filming of the polymeric particles of the aqueous composition during drying it is possible to use, particularly as a temporary plasticizer of the polymer particles, a long-chain alcohol, preferably a butanediol, based in particular on triethylene glycol or tripropylene glycol. The additives which are useful here and can be added are basically known to the skilled worker.

The aqueous composition may where appropriate comprise in each case at least one biocide, defoamer, wetting agent and/or at least one further additive such as is typical for paints or paintlike compositions.

Metallic Substrates or Metallically Coated Substrates, Their Treatment/Pretreatment, Their Coating with the Paintlike Coating, and the Further Course of the Method:

The term "clean metallic surface" here denotes an uncleaned metallic, e.g., freshly galvanized, surface on which no cleaning is needed, or a freshly cleaned surface.

In the case of the method of the invention the aqueous composition can be applied by roller application, flowcoating, knifecoating, squirting, spraying, brushing or dipping, including dipping at elevated temperature of the aqueous composition and, where appropriate, by subsequent squeezing off, for example, using a roll.

The aqueous composition may have a pH in the range from 0.5 to 12, preferably in the range from 1 to 6 or from 7 to 9, more preferably in the range from 1.5 to 4 or from 6 to 10.5, depending on whether the method is carried out in the acidic or rather in the basic range.

The aqueous composition may be applied in particular at a temperature in the range from 5 to 50° C. to the metallic surface, preferably in the range from 10 to 40° C., more preferably in the range from 18 to 25° C., or at from 30 to 95° C.

In the case of the method of the invention the metallic surface when the coating is applied may be held at temperatures in the range from 5 to 120° C., preferably in the range from 10 to 60° C., very preferably from 18 to 25° C, or at from 50 to 120° C.

In the case of films of this kind final drying may last many days, whereas the essential drying can be completed in just a few seconds. Under certain circumstances, curing may take several weeks until the ultimate state of drying and state of cure has been reached, possibly accompanied by filming and/or cross-linking. If necessary, the state of cure can additionally be accelerated or intensified by acceleration of the crosslinking by radiation, for example, with UV radiation or by heating, and/or else by adding, for example, compounds containing free NCO groups and reacting them with the carboxyl groups of the carboxyl-containing polymers.

Additionally, the coated metallic surface can be dried at a temperature in the range from 20 to 400° C., preferably in the range from 40 to 120° C. or in the range from 140 to 350° C., very preferably at from 60 to 100° C. or at from 160 to 300° C. PMT (peak metal temperature), depending on the chemical composition of the organic film formers. The necessary residence time during drying is substantially inversely proportional to the drying temperature: in the case of strip-form material, for example, from 1 to 3 s at 100° C. or from 1 to 20 s at 250° C. in accordance with the chemical composition of the synthetic resins or polymers, or 30 min at 20° C., while polyester resins containing free carboxyl groups in combination with melamine-formaldehyde resins cannot be dried at temperatures below 120° C. Moreover, depending among other things on their wall thickness, coated moldings must be dried for significantly longer. Particularly suitable for drying is drying equipment based on air circulation, induction, infrared and/or microwaves.

The layer thickness of the coating of the invention is situated preferably in the range from 0.1 to 6 µm, more preferably in the range from 0.2 to 5 µm, very preferably in the range from 0.4 to 4 µm, in particular in the range from 0.7 to 2 µm.

The fractional areas of the delaminated area in the T-bend test on moldings (metal sheets) coated with coil coating material are preferably up to 8%, more preferably up to 5%, very preferably up to 2%, but with the best values situated at approximately 0%, so that then normally only cracks occur. For this purpose it is possible with preference to use a coil coating material based on silicone-polyester, especially for comparative testing in tests which are typical for coated coils. The freedom from cracks or the size of the cracks here is also substantially dependent on the nature of the coating material used, however.

In the context of the coating of strips, the coated strips can be wound to form a coil, where appropriate after cooling to a temperature in the range from 40 to 70° C.

To the partly or fully dried and/or cured film it is possible to apply in each case at least one coating comprising varnish, paintlike coating, polymer, paint, functional plastics coatings, adhesives and/or adhesive backing such as, for example, a self-adhesive sheet; in particular, a wet coating, a powder coating, a plastics coating, an adhesive inter alia for film coating.

The metal parts coated inventively with the aid of the aqueous composition, especially strips or strip sections, can be formed, painted, coated with polymers such as PVC, for example, printed, coated with adhesive, hot-soldered, welded and/or joined to one another or to other elements by clinching or other joining techniques. These processes are known fundamentally for the coating of metallic strips or architectural applications. Generally, painting or other coating is carried out first, followed by forming. If the coating of the invention is painted or coated with plastic, soldered and/or welded connections cannot be produced without the coatings being removed, at least locally.

The part with a metallic surface that is coated inventively with the aqueous composition may be a wire, a wire winding, a wire mesh, a steel strip, a metal sheet, a panel, a shield, a vehicle body or part of a vehicle body, a part of a vehicle, trailer, recreational vehicle or missile, a cover, a casing, a lamp, a light, a traffic light element, a furniture item or furniture element, an element of a household appliance, a frame, a profile, a molding of complex geometry, a guideboard element, radiator element or fencing element, a bumper, a part made from or with at least one pipe and/or one profile, a window frame, door frame or cycle frame, or a small part such as, for example, a bolt, nut, flange, spring or a spectacle frame. The substrates coated in accordance with the invention may be used in particular in the vehicle, air travel or space travel industry, in architecture or in appliance construction, especially for household appliances.

The method of the invention represents an alternative to the aforementioned chromate-rich processes and also to acid-free or acid-containing processes, particularly in the area of the surface pretreatment of metal strip prior to painting, and in comparison with these processes provides results of similar quality in terms of corrosion control and paint adhesion. The coatings of the invention may be substantially or entirely free not only of chromium(VI) compounds but also of chromium (III) compounds, without losing quality as a result.

The method of the invention can, however, also be employed advantageously in the presence of at least one chromium compound if corrosion control is to be maintained across a wide spectrum and with high security, especially with regard to damage to the protective layer that may be caused by mechanical stresses during transport, storage, and assembly of the substrates treated with the treatment liquid of the invention on the substrate surface. In that case it is possible to add, for example, sodium dichromate, potassium dichromate and/or ammonium dichromate. The amount of chromium(VI) compounds in that case is preferably from 0.01 to 100 g/L, more preferably from 0.1 to 30 g/L.

Furthermore, it is possible to employ the method of the invention for treating the conventionally cleaned metal surface without a subsequent aftertreatment such as rinsing with water or with a suitable after-rinse solution. The method of the invention is particularly suitable for the application of the treatment solution by means of squeeze rolls or by means of what is called a rollcoater, in which case the treatment solution can be dried immediately following application without further method steps in between (dry-in-place technology). As a result, the method is simplified considerably as compared, for example, with conventional spraying or dipping processes, particularly those involving subsequent rinse operations, such as chromating or zinc-phosphating, and only very small quantities of rinsing water for plant cleaning are produced after the end of operation, since there is no need for a rinsing operation following application, which also constitutes an advantage over the established chromium-free processes which operate in a spraying process with after-rinse solutions. This rinsing water can be added to a new batch of the bath solution.

It is readily possible here to use the polymeric, optionally chromate-free, coating of the invention without the preceding application of an additional pretreatment layer, so that outstanding long-term protection of the metallic surfaces and especially on AlSi, ZnAl such as Galfan®, AlZn such as Galvalume®, ZnFe, ZnNi such as Galvanneal®, and other Zn alloys as metallic coatings or Al or Zn coatings is possible and can be achieved by applying a polymer-containing coating. Furthermore, the coating of the invention has also proven effective in cases of metallic surfaces highly susceptible to corrosion, such as those of iron alloys and steel alloys, particularly in the case of cold-rolled steel, in which case it is advantageous to add at least one corrosion inhibitor to the aqueous composition. This allows the formation of flash rust to be prevented during the drying of the treatment liquid on cold-rolled steel (CRS).

Thus it is possible to achieve a cost-effective and environmentally friendly corrosion control which in addition does not require a costly UV cure but instead is adequately curable solely with the drying and filming or with the "common chemical" cure, often referred to as "thermal crosslinking". In some cases, however, it may be of interest to obtain a harder coating rapidly in a defined operating step. In that case it can be advantageous to add at least one photoinitiator and to select at least one UV-curable polymer component in order to obtain partial crosslinking on the basis of actinic radiation, especially UV radiation. The coating of the invention can then be brought to cure partly by actinic radiation and partly by drying and filming or by thermal crosslinking. This may be of importance particularly in the case of application to high-speed strip plants or for the first crosslinking (i.e., curing). The fraction of the UV crosslinking, as it is termed, can be from 0 to 50% of the total possible curing, preferably from 10 to 40%.

The polymeric and substantially or entirely chromate-free coating of the invention also has the advantage that, particularly with a thickness in the range from 0.5 to 3 µm, it is transparent and light in color, so that the metallic nature and the typical structure, for example, of a galvanized or of a Galvalume® surface remains visible exactly and without alteration, or virtually without alteration, through the coating. Moreover, such thin coatings can still be welded without problems.

Furthermore, the polymeric coating of the invention is readily deformable, since it can be made so that, after coating, drying, and curing, and also, where appropriate, for a period of time, it is in a relatively plastic state rather than a hard, brittle state.

The polymer-containing coating of the invention can be readily overcoated with the majority of paints or plastics. The polymer-containing coating of the invention can be afterpainted or coated with plastic such as PVC by application techniques such as, for example, powder coating, wet painting, flowcoating, rolling, brushing or dipping. In the majority of cases, the cured coatings thereby produced which are applied to the polymer-containing coating of the invention, and for which in many cases it is also possible to apply two or three paint or plastics layers, have a total thickness in the range from 5 up to 1500 µm.

The polymeric coating of the invention can also be backed in a mold with foam, polyurethane insulating foam for example, without problems in order to produce two-sheet sandwich elements, or can be bonded effectively using the usual construction adhesives such as are employed, for example, in vehicle construction.

The coatings of the invention can be used in particular as primer layers. With or without at least one pretreatment layer applied beforehand, they are outstandingly suitable. This pretreatment layer may then be, inter alia, a coating based on phosphate, especially ZnMnNi phosphate, or based on phosphonate, silane and/or a mixture based on fluoride complex, corrosion inhibitor, phosphate, polymer and/or finely divided particles.

The coatings of the invention produce pretreatment layers or primer layers which together with the subsequently applied paint produced a coating system which is equal to the best chromium-containing coating systems.

The coatings of the invention are very inexpensive, environmentally friendly, and well suited to industrial use.

It was surprising that with a synthetic resin coating of the invention, despite a layer thickness of only about 0.5 to 1.5 µm, it was possible to produce an extremely high-quality chromium-free film which does not discolor the substrate surfaces and which provides excellent corrosion control. Further, it was surprising that simply the addition of finely divided particles resulted in a significant improvement in corrosion resistance. Very surprisingly, the basic crosslinking agent, especially together with a corrosion inhibitor, improved the corrosion control significantly once again.

As compared with the processes described and/or practiced to date, the method of the invention has the further advantage that on aluminum-rich or on an aluminum-alloy-coated substrate—particularly in the case of a substrate of steel—it causes no darkening of the substrate surface and also no milky white dulling of the substrate surface, and so can be used for the decorative design of buildings and/or parts of buildings without additional painting to impart color. The esthetics of the metal surface remain unchanged.

Use of Anticorrosion Layers and/or of Paintlike or Paint Layers:

If anticorrosion layers are applied in the context of the method of the invention, this may be one to four layers, which can all be applied to one another directly, one after the other. It is preferred to apply at least two or three anticorrosion layers in succession. Each of these layers is preferably an anticorrosion layer selected from the group consisting of coatings based in each case on iron-cobalt, nickel-cobalt, at least one fluoride, at least one complex fluoride, especially tetrafluoride and/or hexafluoride, an organic hydroxy compound, a phosphate, a phosphonate, a polymer, a rare earth compound comprising at least one rare earth element, including lanthanum and yttrium, a silane/siloxane, a silicate, cations of aluminum, magnesium and/or at least one transition metal selected from the group consisting of chromium, iron, hafnium, cobalt, manganese, molybdenum, nickel, titanium, tungsten, and zirconium, or is a coating based on nanoparticles, but it is also possible where appropriate for at least one further anticorrosion layer to be applied. In this case the at least one further anticorrosion layer may be applied, as desired, before and/or after the first, second or third anticorrosion layer. It can be important to apply more than one anticorrosion layer (pretreatment layer), since the subsequent paintlike or paint layers are often kept so thin in comparison to the prior art paint systems that the corrosion control requirements must be heightened accordingly.

With the method of the invention it is possible, for example, to apply the first anticorrosion layer in a drying method and the second anticorrosion layer in a drying method or rinse method.

A drying method is a no-rinse method in which a film of liquid is applied to the optionally precoated strip. A rinse method is a method of coating which produces a coating by reaction, in particular during spraying or dipping, and in which the coating is subsequently rinsed in order to remove excess chemicals, and in which the coating, finally, is dried. It is preferred to apply coatings based, for example, on zinc phosphate and/or manganese phosphate, usually containing a small amount of nickel, by a no-rinse method. It is, however, also possible for many other kinds of coating-com-dried.

With this method it is possible, for example, to apply the first anticorrosion layer by a rinse method and the second anticorrosion layer by a drying method or rinse method.

In this case, the second anticorrosion layer can be applied in an afterrinsing step, in particular after the first anticorrosion layer has been applied beforehand on a galvanizing line.

The galvanizing line may preferably operate electrolytic galvanizing, electrolytic alloy galvanizing, hot galvanizing, hot-dip galvanizing and/or hot-dip alloy galvanizing. Coatings applied here may be, inter alia, pure zinc, zinc with a purity in the range from 98 to 99.9%, aluminum-zinc alloys, zinc-aluminum alloys, and zinc-nickel alloys.

The second anticorrosion layer may be applied here by a drying method, in particular after the first anticorrosion layer has been applied beforehand on a galvanizing line. Galvanizing on the galvanizing line may preferably comprise electrolytic galvanizing, hot galvanizing, hot-dip galvanizing and/or hot-dip alloy galvanizing.

With the method of the invention it is possible to coat surfaces of aluminum, iron, cobalt, copper, magnesium, nickel, titanium, tin or zinc or alloys comprising aluminum, iron, cobalt, copper, magnesium, nickel, titanium, tin and/or zinc, especially electrolytically galvanized or hot-dip galvanized surfaces. The following are preferred metallic coatings on the metallic strips: electrolytically galvanized steel, hot-dip-galvanized steel, hot-dip alloy-galvanized steel, and aluminum alloy coated with pure aluminum.

The pretreatment prior to painting is preferably chromium-free or substantially chromium-free, in particular chromium-free to the extent that no chromium is deliberately added. The pretreatment solutions also preferably contain little or no cobalt, copper, nickel and/or other heavy metals, respectively.

With the method of the invention it is possible to coat with at least one liquid, solution or suspension which is substantially or entirely free from chromium compounds before coating with at least one paint and/or with at least one paintlike polymer-containing layer which comprises polymers, copolymers, crosspolymers, oligomers, phosphonates, silanes and/or siloxanes. Substantially free from chromium may here mean without deliberate addition of a chromium compound. The term "liquid" also embraces solvent-free compounds or mixtures in liquid form.

This method may also be distinguished by the fact that no lead, cadmium, chromium, cobalt, copper and/or nickel is added to the liquid, solution or suspension for the first and/or second anticorrosion layer. Heavy metals which are added, such as lead, cadmium, chromium, cobalt, copper and/or nickel, are generally added only in minimal amounts.

Because of the at least one anticorrosion layer, it is possible in the case of the method of the invention, as compared with the state of the art on the priority date, to forego at least one of the otherwise customary pretreatment layers, paint layers and/or paintlike polymer-containing layers, in particular a pretreatment layer and a paint layer (see Tables 2A-J relating to variants A ff).

In this case the liquid, solution or suspension for at least one of the anticorrosion layers and/or paintlike polymer-containing layers may comprise, in addition to water, at least one organic film former with at least one water-soluble or water-dispersed polymer, copolymer, block copolymer, crosspolymer, monomer, oligomer, derivative(s) thereof, mixture(s) thereof and/or addition copolymer(s) thereof. The fraction of these organic compounds in a layer is preferably in the range from 60 to 99.8% by weight, based on the solids content.

In this context, the liquid, solution or suspension for at least one of the anticorrosion layers and/or paint-like polymer-containing layers may comprise, in addition to water, a total content of cations, tetrafluoro complexes and/or hexafluoro complexes of cations selected from the group consisting of titanium, zirconium, hafnium, silicon, aluminum, and boron and/or free or otherwise-bound fluorine, in particular from 0.1 to 15 g/L complex fluoride based on $F_6$, preferably from 0.5 to 8 g/L complex fluoride based on $F_6$, or from 0.1 to 1000 mg/L of free fluorine. The fraction of these compounds in a layer is preferably in the range from 5 to 99.9% by weight.

In this context, the liquid, solution and/or suspension for at least one of the anticorrosion layers and/or paintlike polymer-containing layers may comprise, in addition to water, a total content of free fluorine or fluorine not attached to tetrafluoro or hexafluoro complexes, in particular from 0.1 to 1000 mg/L calculated as free fluorine, preferably from 0.5 to 200 mg/L, more preferably from 1 to 150 mg/L.

In the case of the method of the invention the liquid, solution or suspension for at least one of the anticorrosion layers, paint layers and/or paintlike polymer-containing layers may comprise, in addition to water, at least one inorganic compound in particle form having an average particle diameter, measured under a scanning electron microscope, in the range from 0.003 up to 1 μm diameter, preferably in the range from 0.005 up to 0.2 μm diameter, based in particular on $Al_2O_3$, $BaSO_4$, rare earth oxide(s), at least one other rare earth compound, $SiO_2$, silicate, $TiO_2$, $Y_2O_3$, Zn, ZnO and/or $ZrO_2$, preferably in an amount in the range from 0.1 to 80 g/L, more preferably in an amount in the range from 1 to 50 g/L, very preferably in an amount in the range from 2 to 30 g/L. The fraction of these compounds in particle form in a layer is preferably in the range from 5 to 90% by weight, more preferably in the range from 10 to 50% by weight. Electrically conductive particles can be used as well, such as iron oxide, iron phosphite, molybdenum compounds such as molybdenum sulfide, graphite and/or carbon black, for example, and/or it is also possible to use an addition of conductive polymers if the metal sheets are to be joined, where appropriate by welding. These anti-corrosion layers are preferably free of elemental zinc.

In the case of the method of the invention the liquid, solution or suspension for at least one of the anti-corrosion layers, paint layers or paintlike polymer-containing layers may comprise at least one corrosion inhibitor. The corrosion inhibitor may contain at least one organic group and/or at least one amino group. It can be an organic compound or an ammonium compound, in particular an amine or an amino compound, such as, for example, an alkanolamine, a TPA-amine complex, a phosphonate, a polyaspartic acid, a thiourea, a Zr ammonium carbonate, benzotriazole, a tannin, an electrically conductive polymer such as a polyaniline, for example, and/or contain derivatives thereof. In particular it is selected from the group consisting of organic phosphate compounds, phosphonate compounds, organic morpholine and thio compounds, aluminates, manganates, titanates, and zirconates, preferably of alkylmorpholine complexes, organic Al, Mn, Ti and/or Zr compounds especially of the olefinically unsaturated carboxylic acids, for example, ammonium salt of carboxylic acids such as chelated lactic acid titanate, triethanolamine titanate or triethanolamine zirconate, Zr-4-methyl-γ-oxo-benzyne-butanoic acid, aluminum zirconium carboxylate, alkoxypropenolatotitanate or alkoxypropenolatozirconate, titanium acetate and/or zirconium acetate and/or derivatives thereof, Ti/Zr ammonium carbonate. The fraction of these compounds in a layer is preferably in the range from 5 to 40% by weight.

In this context, the liquid, solution or suspension for at least one of the anticorrosion layers, paint layers or paintlike polymer-containing layers may comprise at least one compound for the neutralization, in particular the slow neutralization, of comparatively acidic mixtures and/or for the corrosion control of unprotected or damaged portions of the metallic surface, based preferably on carbonate or hydroxy-carbonate or conductive polymers, more preferably at least one basic compound with a layer structure such as, for example, Al-containing hydroxy-carbonate hydrate (hydrotalcite). The fraction of these compounds in a layer is preferably in the range from 3 to 30% by weight.

In this context, the liquid, solution or suspension for at least one of the anticorrosion layers, paint layers and/or paintlike polymer-containing layers may in addition to water comprise at least one silane and/or siloxane, calculated as silane, in particular in an amount in the range from 0.1 to 50 g/L, preferably in an amount in the range from 1 to 30 g/L.

In this context, the liquid, solution or suspension for at least one of the anticorrosion layers, paint layers and/or paintlike polymer-containing layers may in addition to water and/or at least one organic solvent comprise at least one silane and/or siloxane, calculated as silane, in particular in an amount in the range from 51 to 1300 g/L.

In this context, the liquid, solution or suspension for at least one of the anticorrosion layers, paint layers and/or paintlike polymer-containing layers may where appropriate in addition to water and/or at least one organic solvent comprise at least one silane and/or siloxane, calculated as silane, in particular in an amount in the range from 0.1 to 1600 g/L, preferably in an amount in the range from 100 to 1500 g/L.

The silane may be an acyloxysilane, an alkylsilane, an alkyltrialkoxysilane, an aminosilane, an aminoalkylsilane, an aminopropyltrialkoxysilane, a bis-silylsilane, an epoxysilane, a fluoroalkylsilane, a glycidyloxysilane such as, for example, a glycidyloxytrialkoxysilane, an isocyanatosilane, a mercaptosilane, a (meth)acrylatosilane, a mono-silyl-silane, a multi-silyl-silane, a bis(trialkoxysilylpropyl)amine, a bis(trialkoxysilyl)ethane, a sulfur-containing silane, a bis(trialkoxysilyl)propyltetrasulfane, a ureidosilane such as, for example, a (ureidopropyltrialkoxy)silane and/or a vinylsilane, in particular a vinyltrialkoxysilane and/or a vinyltriacetoxysilane. It can be, for example, at least one silane in a mixture with up to 8% by weight, based on the silane content, of at least one alcohol such as methanol, ethanol and/or propanol, preferably up to 5% by weight, more preferably up to 1% by weight, very preferably up to 0.5% by weight, in the presence or absence of inorganic particles, in particular in a mixture of at least one aminosilane such as, for example, bis-amino-silane with at least one alkoxysilane such as, for example, trialkoxysilylpropyltetrasulfane or a vinylsilane and a bis-silyl-aminosilane or a bis-silyl-polysulfur-silane and/or a bis-silyl-aminosilane or an amino silane and a multi-silyl-functional silane.

In the case of the method of the invention the liquid, solution or suspension for at least one of the anticorrosion layers, paint layers and/or paintlike polymer-containing layers may comprise an organic film former in the form of a solution, dispersion, emulsion, microemulsion and/or suspension.

In this context, the liquid, solution or suspension for at least one of the anticorrosion layers, paint layers and/or paintlike polymer-containing layers may comprise as organic film former at least one synthetic resin, in particular at least one synthetic resin based on acrylate, ethylene, polyester, polyurethane, silicone-polyester, epoxide, phenol, styrene, styrene-butadiene, urea-formaldehyde, their derivatives, copolymers, block copolymers, crosspolymers, monomers, oligomers, polymers, mixtures and/or addition copolymers. As a generic term for all of these variants of synthetic resins and their derivatives, copolymers, block copolymers, crosspolymers, monomers, oligomers, polymers, mixtures, and addition copolymers, the term "polymer" is used here, in particular for the paintlike layers as well.

In this context, the liquid, solution or suspension for at least one of the anticorrosion layers, paint layers and/or paintlike polymer-containing layers may comprise as organic film former a synthetic resin mixture and/or addition copolymer comprising synthetic resin based on acrylate, ethylene, urea-formaldehyde, polyester, poly-urethane, styrene and/or styrene-butadiene and/or their derivatives, copolymers, crosspolymers, oligomers, polymers, mixtures and/or addition copolymers, from which an organic film is formed during or after the emission of water and other volatile constituents.

In this context, the liquid, solution or suspension for at least one of the anticorrosion layers, paint layers and/or paintlike polymer-containing layers may comprise as organic film former synthetic resins and/or polymers, copolymers, block copolymers, crosspolymers, monomers, oligomers, polymers, mixtures and/or addition copolymers and/or their derivatives based on acrylate, polyethyleneimine, polyurethane, polyvinyl alcohol, polyvinylphenol, polyvinylpyrrolidone and/or poly-aspartic acid, especially copolymers with a phosphorus-containing vinyl compound.

In this context, the liquid, solution or suspension for at least one of the anticorrosion layers, paint layers and/or paintlike polymer-containing layers may comprise a synthetic resin whose acid number is in the range from 5 to 250. The acid number is preferably in the range from 10 to 140, more preferably in the range from 15 to 100.

In this context, the liquid, solution or suspension for at least one of the anticorrosion layers, paint layers and/or paintlike polymer-containing layers may comprise synthetic resins and/or polymers, copolymers, block copolymers, crosspolymers, monomers, oligomers, polymers, mixtures and/or addition copolymers and/or derivatives thereof whose molecular weights are in the range of at least 1000 u, preferably of at least 5000 u or of up to 500 000 u, more preferably in the range from 20 000 to 200 000 u.

In this context, the liquid, solution or suspension for at least one of the anticorrosion layers, paint layers and/or paintlike polymer-containing layers may comprise synthetic resins and/or polymers, copolymers, block copolymers, crosspolymers, monomers, oligomers, polymers, mixtures and/or addition copolymers and/or derivatives thereof, in particular based inter alia on pyrrolidone(s), in particular from 0.1 to 500 g/L, preferably from 0.5 to 30 or from 80 to 250 g/L.

In this context, the liquid, solution or suspension for at least one of the anticorrosion layers, paint layers and/or paintlike polymer-containing layers may comprise an organic film former whose pH in an aqueous formulation without addition of further compounds is in the range from 1 to 12, preferably in the range from 2 to 10, more preferably in the range from 2.5 to 9.

In this context, the liquid, solution or suspension for at least one of the anticorrosion layers, paint layers and/or paintlike polymer-containing layers may comprise an organic film former which contains only water-soluble synthetic resins and/or polymers, copolymers, block copolymers, crosspolymers, monomers, oligomers, polymers, mixtures and/or addition copolymers and/or their derivatives, particularly those which are stable in solutions with pH levels $\leqq 5$.

In this context, the liquid, solution or suspension for at least one of the anticorrosion layers, paint layers and/or paintlike polymer-containing layers may comprise an organic film former whose synthetic resin and/or polymers, copolymers, block copolymers, crosspolymers, monomers, oligomers, polymers, mixtures and/or addition copolymers and/or their derivatives contain carboxyl groups.

In this context, the liquid, solution or suspension for at least one of the anticorrosion layers, paint layers and/or paintlike polymer-containing layers may comprise an organic film former in which the acid groups of the synthetic resins and/or polymers, copolymers, block copolymers, crosspolymers, monomers, oligomers, polymers, mixtures and/or addition copolymers and/or their derivatives have been stabilized with ammonia, with amines such as morpholine, dimethylethanolamine, diethylethanolamine or triethanolamine, for example, and/or with alkali metal compounds such as sodium hydroxide, for example.

In the case of the method of the invention the liquid, solution or suspension for at least one of the anticorrosion layers, paint layers and/or paintlike polymer-containing layers comprise from 0.1 to 200 g/L and preferably from 0.3 to 50 g/L of the organic film former, in particular from 0.6 to 20 g/L.

In this context, the liquid, solution or suspension for at least one of the anticorrosion layers, paint layers and/or paintlike polymer-containing layers can comprise from 100 to 2000 g/L and preferably from 300 to 1800 g/L of the organic film former, in particular from 800 to 1400 g/L.

In the case of the method of the invention the liquid, solution or suspension for at least one of the anticorrosion layers, paint layers and/or paintlike polymer-containing layers may include a monomer fraction, in particular in the region of at least 5% by weight, preferably of at least 20% by weight, more preferably of at least 40% by weight. In this context, especially with a high fraction of monomers, it is possible, where appropriate, for the fraction of water and/or organic solvent to be reduced and in particular to be less than 10% by weight; in certain circumstances it may even be entirely or substantially free from water and/or organic solvent.

In the case of the method of the invention the liquid, solution or suspension for at least one of the anticorrosion layers, paint layers and/or paintlike polymer-containing layers may comprise from 0.1 to 50 g/L of cations, tetrafluoro complexes and/or hexafluoro complexes of cations selected from the group consisting of titanium, zirconium, hafnium, silicon, aluminum, and boron, preferably hexafluoro complexes of titanium, zirconium and/or silicon preferably a coating of 2 to 20 g/L.

In this context, the liquid, solution or suspension for at least one of the anticorrosion layers, paint layers and/or paintlike polymer-containing layers may comprise at least one organo-metallic compound, particularly containing titanium and/or zirconium. These organo-metallic compounds are often corrosion inhibitors and often also adhesion promoters at the same time.

In the case of the method of the invention the liquid, solution or suspension for at least one of the anticorrosion layers, paint layers and/or paintlike polymer-containing layers may include at least one silane and/or siloxane calculated as silane in the aqueous composition, preferably in a range from 0.2 to 40 g/L, more preferably in a range from -0.5 to 10 g/L.

In this context, the liquid, solution or suspension for at least one of the anticorrosion layers, paint layers and/or paintlike polymer-containing layers may comprise at least one partly hydrolyzed silane, at least one wholly hydrolyzed silane and/or at least one siloxane.

In the course of the curing of the coating, siloxanes are formed from the silanes. It is also possible, however, to add corresponding siloxanes. The silanes/siloxanes may be used either alone, in a mixture, for example, with at least one fluoride complex, or else together with polymers.

In this context, the liquid, solution or suspension for at least one of the anticorrosion layers, paint layers and/or paintlike polymer-containing layers may comprise at least one partly hydrolyzed and/or nonhydrolyzed silane, in particular in the case of a silane content of more than 100 g/L, more preferably in the case of a silane content of more than 1000 g/L.

In this context, the liquid, solution or suspension for at least one of the anticorrosion layers, paint layers and/or paintlike polymer-containing layers may comprise in each case at least one acyloxysilane, alkylsilane, aminosilane, bis-silyl-silane, epoxysilane, fluoro-alkylsilane, glycidyloxysilane, isocyanatosilane, mercaptosilane, (meth)acrylatosilane, mono-silyl-silane, multi-silyl-silane, sulfur-containing silane, ureidosilane, vinylsilane and/or at least one corresponding siloxane.

In the case of the method of the invention the liquid, solution or suspension for at least one of the anticorrosion layers, paint layers and/or paintlike polymer-containing layers may have added to it as inorganic compound in particle form a finely divided powder, a dispersion or a suspension such as, for example, a carbonate, oxide, silicate or sulfate, especially colloidal or amorphous particles.

In this context it is possible for the liquid, solution or suspension for at least one of the anticorrosion layers, paint layers and/or paintlike polymer-containing layers to have added to it as inorganic compound in particle form particles having an average size in the range from 4 nm to 150 nm, in particular in the range from 10 to 120 nm. The average size of the electrically conducting particles of a welding primer may be situated within the range from 0.02 to 15 µm.

In this context, the liquid, solution or suspension for at least one of the anticorrosion layers, paint layers and/or paintlike polymer-containing layers may have added to it as inorganic compound in particle form particles based on at least one compound of aluminum, barium, cerium, calcium, lanthanum, silicon, titanium, yttrium, zinc and/or zirconium.

In this context, to the liquid, solution or suspension for at least one of the anticorrosion layers, paint layers and/or paintlike polymer-containing layers may comprise from 0.1 to 300 g/L, preferably from 0.2 to 60 g/L, of the at least one inorganic compound in particle form.

In the case of the method of the invention the liquid, solution or suspension for at least one of the anticorrosion layers, paint layers and/or paintlike polymer-containing layers may as organic solvent for the organic polymers be used at least one water-miscible and/or water-soluble alcohol, one glycol ether and/or one pyrrolidone such as, for example, N-methylpyrrolidone and/or water; where a solvent mixture is used, it is in particular a mixture of at least one long-chain alcohol, such as propylene glycol, for example, an ester alcohol, a glycol ether and/or butanediol with water, but preferably only water without organic solvent.

In the case of the method of the invention the liquid, solution or suspension for at least one of the anti-corrosion layers, paint layers and/or paintlike polymer-containing layers may comprise organic solvent in an amount in the range from 0.1 to 10% by weight.

In the case of the method of the invention the liquid, solution or suspension for at least one of the anticorrosion layers, paint layers and/or paintlike polymer-containing layers may comprise as lubricant at least one wax selected from the group consisting of paraffins, polyethylenes, and polypropylenes, in particular an oxidized wax. The amount of waxes in a layer is preferably in the range from 0.1 to 20% by weight.

In this context, the liquid, solution or suspension for at least one of the anticorrosion layers, paint layers and/or paintlike polymer-containing layers may comprise a wax lubricant whose melting point is in the range from 40 to 160° C., preferably from 0.1 to 100 g/L, more preferably from 20 to 40 g/L or from 0.1 to 10 g/L, very preferably 0.4 to 6 g/L, for example, a crystalline polyethylene wax.

In the case of the method of the invention the liquid, solution or suspension for at least one of the anticorrosion layers, paint layers and/or paintlike polymer-containing layers may comprise at least one rare earth element compound, in particular at least one compound selected from the group consisting of chloride, nitrate, sulfate, sulfamate, and complexes, for example, with a halogen or with an aminocarboxylic acid, in particular complexes with EDTA, NTA or HEDTA, in which context scandium, yttrium, and lanthanum are also regarded as being rare earth elements.

In this context, the liquid, solution or suspension for at least one of the anticorrosion layers and/or paintlike polymer-containing layers may comprise a rare earth element compound of and/or with cerium, in particular in a mixture with other rare earth elements, for example, at least partly based on mixed metal. The amount of cerium compound in a layer is preferably in the range from 0.1 to 99% by weight, more preferably in the range from 25 to 95% by weight. The at least one rare earth element compound is used in the aqueous solution preferably in an amount of from 1 to 80 g/L together with an amount in the region of at least 10 mg/L of chloride, with an amount of peroxide in the range from 1 to 50 g/L, calculated as $H_2O_2$, and with an amount of at least one cation selected from main group 5 or 6 of the periodic table of the elements, in particular of bismuth ions, in the range from 0.001 to 1 g/L. The amount of the at least one rare earth element compound in the aqueous solution is preferably from 5 to 25 g/L together with an amount in the region of not more than 500 mg/L of chloride, with an amount of peroxide in the range from 5 to 25 g/L, calculated as $H_2O_2$, and with an amount of at least one cation selected from main group 5 or 6 of the periodic table of the elements, in particular of bismuth ions, in the range from 0.01 to 0.3 g/L.

In the case of the method of the invention the liquid, solution or suspension for at least one of the anticorrosion layers, paint layers and/or paintlike polymer-containing layers may comprise at least one oxidizing agent, in particular a peroxide, at least one accelerator and/or at least one catalyst, preferably a compound and/or ions of Bi, Cu and/or Zn.

In the case of the method of the invention the liquid, solution or suspension for at least one of the anticorrosion layers, paint layers and/or paintlike polymer-containing layers may comprise at least one compound selected from the group of the mono-, bis-, and multi-silanes, especially:

mono-silanes of the general formula $SiX_mY_{4-m}$
- with m=1 to 3, preferably m=2 to 3,
- with X=alkoxy, especially methoxy, ethoxy and/or propoxy, and
- with Y as a functional organic group selected from the group consisting of acyloxy, alkyl, acrylate, amino, epoxy, fluoroalkyl, glycidyloxy, urea, isocyanate, mercapto, methacrylate and/or vinyl and/or derivatives thereof, bis-silanes of the general formula $Y_{3-p}X_p$—Si-Z-Si—$X_nY_{3-n}$
- with p and n=1 to 3, identical or different,
- with X=alkoxy, especially methoxy, ethoxy and/or propoxy, and
- with Y as a functional organic group selected from the group consisting of acyloxy, alkyl, acrylate, amino, epoxy, fluoroalkyl, glycidyloxy, urea, isocyanate, mercapto, methacrylate and/or vinyl and/or derivatives thereof,
  - with Z selected from the group of $C_nH_{2n}$ with n=2 to 20, in each case branched or unbranched, of singly unsaturated alkyl chains of the general formula $C_nH_{2n-2}$ with n=2 to 20, in each case branched or unbranched, of doubly and/or multiply unsaturated alkyl compounds of the general formulae $C_nH_{2n-4}$ with n=4 to 20, in each case branched or unbranched, $C_nH_{2n-6}$ with n=6 to 20, in each case branched or unbranched, or $C_nH_{2n-8}$ with n=8 to 20, in each case branched or unbranched, of ketones, monoalkylamines, NH, and sulfur $S_q$ with q=1 to 20, multi-silanes of the general formula $Y_{3-p}X_p$—Si-Z'-Si—$X_nY_{3-n}$
- with p and n=1 to 3, identical or different,
- with X=alkoxy, especially methoxy, ethoxy and/or propoxy, and
- with Y as a functional organic group selected from the group consisting of acyloxy, alkyl, acrylate, amino, epoxy, fluoroalkyl, glycidyloxy, urea, isocyanate, mercapto, methacrylate, mono/bis/multi-silyl and vinyl and/or derivatives thereof,
  - and with Z'=N—Si—$X_rY_{3-r}$ with r=1 to 3 or sulfur $S_q$ with q=1 to 20, multi-silanes of the general formula $Y_{3-p}X_p$—Si-Z"-Si—$X_nY_{3-n}$
- with p and n=1 to 3, identical or different,
- with X=alkoxy, especially methoxy, ethoxy and/or propoxy, and
- with Y as a functional organic group selected from the group consisting of acyloxy, alkyl, acrylate, amino, epoxy, fluoroalkyl, glycidyloxy, urea, isocyanate, mercapto, methacrylate mono/bis/multi-silyl and vinyl and/or derivatives thereof,
  - and with Z"=—R—C[($SiX_sY_{3-s}$)($SiX_tY_{3-t}$)]—R'— or sulfur $S_q$ with q=1 to 20,
  - with s and t=1 to 3, identical or different,
  - with R and R', identical or different, selected from the group of $C_nH_{2n}$ with n=2 to 20, in each case branched or unbranched, of singly unsaturated alkyl chains of the general formula $C_nH_{2n-2}$ with n=2 to 20, in each case branched or unbranched, of doubly and/or multiply unsaturated alkyl compounds of the general formulae $C_nH_{2n-4}$ with n=4 to 20, in each case branched or unbranched, $C_nH_{2n-6}$ with n=6 to 20, in each case branched or unbranched, or $C_nH_{2-8}$ with n=8 to 20, in each case branched or unbranched, of ketones, monoalkylamines, NH, it being possible for the silanes in each case to be present in hydrolyzed, partly hydrolyzed and/or nonhydrolyzed form in a solution, emulsion and/or suspension.

In this context, the total content of silanes and/or siloxanes per layer can be preferably, on the one hand, in the range from 0.01 to 20% by weight, on the other hand, preferably, in the range from 60 to 99.9% by weight.

In the case of the method of the invention the liquid, solution or suspension for at least one of the anticorrosion layers may comprise at least one compound of the type XYZ, X*Y*Z* and/or X*Y*Z*Y*X*,
- where Y is an organic group having 2 to 50 carbon atoms
- where X and Z, identical or different, are an OH, SH, $NH_2$, NHR', CN, CH=$CH_2$, OCN, CONHOH, COOR', acrylamide, epoxide, $CH_2$=CR"—COO, COOH, $HSO_3$, $HSO_4$, $(OH)_2PO$, $(OH)_2PO_2$, (OH) (OR')PO, (OH) (OR')$PO_2$, $SiH_3$ and/or an $Si(OH)_3$ group,
- where R' is an alkyl group having 1 to 4 carbon atoms, where R" is a hydrogen atom or an alkyl group having 1 to 4 carbon atoms, where the groups X and Z are each attached to the group Y in the terminal position thereof, where Y* is an organic group having 1 to 30 carbon atoms, where X* and Z*, identical or different, are an OH, SH, $NH_2$, NHR', CN, $CH=CH_2$, OCN, CONHOH, COOR', acrylamide, epoxide, $CH_2=CR''$—COO, COOH, $HSO_3$, $HSO_4$, $(OH)_2PO$, $(OH)_2PO_2$, (OH) (OR')PO, (OH) (OR')$PO_2$, $SiH_3$, $Si(OH)_3$, >N—$CH_2$—$PO(OH)_2$ and/or an —N—$[CH_2$—$PO(OH)_2]_2$ group, where R' is an alkyl group having 1 to 4 carbon atoms, and where R" is a hydrogen atom or an alkyl group having 1 to 4 carbon atoms.

In this context, the liquid, solution or suspension for at least one of the anticorrosion layers may comprise at least one compound of the type XYZ, where X is a COOH, $HSO_3$, $HSO_4$, $(OH)_2PO$, $(OH)_2PO_2$, (OH)(OR')PO or (OH)(OR') $PO_2$ group, where Y is an organic group R containing 2 to 50 carbon atoms, of which at least 60% of these carbon atoms are present in the form of $CH_2$ groups, where Z is an OH, SH, $NH_2$, NHR', CN, $CH=CH_2$, OCN, epoxy, $CH=CR'''$—COOH, acrylamide, COOH, $(OH)_2$ PO, $(OH)_2PO_2$, (OH)(OR')PO or (OH)(OR')$PO_2$ group, where R' is an alkyl group having 1 to 4 carbon atoms, and where R" is a hydrogen atom or an alkyl group having 1 to 4 carbon atoms, preferably in total from 0.01 to 10 g/L, preferably from 0.05 to 5 g/L, very preferably from 0.08 to 2 g/L.

In this context, the compound of type XYZ, X*Y*Z* and/or X*Y*Z*Y*X* may be suitable for forming self-arranging molecules, which may shape a layer of these self-arranging molecules particularly on the metallic surface, preferably a monomolecular layer.

In this context, the liquid, solution or suspension for at least one of the anticorrosion layers may comprise at least one of the following compounds of type XYZ, X*Y*Z* and/or X*Y*Z*Y*X*:

1-phosphonic acid-12-mercaptododecane,
1-phosphonic acid-12-(N-ethylaminododecane),
1-phosphonic acid-12-dodecene,
p-xylylenediphosphonic acid,
1,10-decanediphosphonic acid,
1,12-dodecanediphosphonic acid,
1,14-tetradecanediphosphonic acid,
1-phosphoric acid-12-hydroxydodecane,
1-phosphoric acid-12-(N-ethylamino)dodecane,
1-phosphoric acid-12-dodecene,
1-phosphoric acid-12-mercaptododecane,
1,10-decanediphosphoric acid,
1,12-dodecanephosphoric acid,
1,14-tetradecanediphosphoric acid,
p,p'-biphenyldiphosphoric acid,
1-phosphoric acid-12-acryloyldodecane,
1,8-octanediphosphonic acid,
1,6-hexanediphosphonic acid,
1,4-butanediphosphonic acid,
1,8-octanediphosphoric acid,
1,6-hexanediphosphoric acid,
1,4-butanediphosphoric acid,
aminotrimethylenephosphonic acid,
ethylenediaminetetramethylenephosphonic acid,
hexamethylenediaminetetramethylenephosphonic acid,
diethylenetriaminepentamethylenephosphonic acid,
2-phosphonobutane-1,2,4-tricarboxylic acid.

The amounts of compounds of these types in a layer is preferably in the range from 50 to 100% by weight.

In the case of the method of the invention at least one of the liquids, solutions or suspensions for at least one of the anticorrosion layers and/or paintlike polymer-containing layers may comprise phosphate and zinc, where appropriate also manganese, nickel and/or copper. The amounts of phosphates in a layer is preferably in the range from 8 to 100% by weight, more preferably in the range from 20 to 95% by weight, very preferably in the range from 60 to 90% by weight.

In the case of the method of the invention at least one of the liquids, solutions or suspensions for at least one of the anticorrosion layers and/or paintlike polymer-containing layers may contain from 0.1 to less than 100 g/L zinc ions, from 0.4 to 80 g/L manganese ions, up to 12 g/L nickel ions, up to 100 g/L peroxide, calculated as $H_2O_2$, and from 1 to 500 g/L phosphate ions, calculated as $P_2O_5$, and also, preferably, from 0.2 to less than 50 g/L of zinc ions, from 0.5 to 45 g/L manganese ions, and from 2 to 300 g/L phosphate ions, calculated as $P_2O_5$.

In the case of the method of the invention at least one of the liquids, solutions or suspensions for at least one of the anticorrosion layers and/or paintlike polymer-containing layers may comprise phosphate, preferably based on Zn or ZnMn, where appropriate with nickel content.

In the case of the method of the invention at least one of the liquids, solutions or suspensions for at least one of the anticorrosion layers, paint layers and/or paintlike polymer-containing layers may comprise phosphate, fluoride, tetrafluoride and/or hexafluoride. Preferably, however, phosphonate(s), which align themselves at least partially as self-arranging molecules on the metallic surface, and fluoride complexes with separate solutions in largely separate layers are formed.

In the case of the method of the invention at least one of the liquids, solutions or suspensions for at least one of the anticorrosion layers, paint layers and/or paintlike polymer-containing layers may comprise phosphonate, tetrafluoride and/or hexafluoride.

In the case of the method of the invention at least one of the liquids, solutions or suspensions for at least one of the anticorrosion layers, paint layers and/or paintlike polymer-containing layers may comprise an organic film former, fluoride, tetrafluoride, hexafluoride and/or at least one inorganic compound in particle form, and, where appropriate, at least one silane.

In the case of the method of the invention at least one of the liquids, solutions or suspensions for at least one of the anticorrosion layers, paint layers and/or paintlike polymer-containing layers may comprise an additive selected from the group consisting of organic binders, biocides, defoamers, corrosion inhibitors, adhesion promoters, wetting agents, photoinitiators, and polymerization inhibitors.

In the case of the method of the invention at least one of the liquids, solutions or suspensions for at least one of the anticorrosion layers, paint layers and/or paintlike polymer-containing layers may comprise at least one filler and/or one pigment, in particular at least one electrically conductive pigment selected from the group consisting of dyes, color pigments, graphite, graphite-mica pigments, oxides such as iron oxides, molybdenum compounds, phosphates, phosphides such as iron phosphides, carbon black and zinc. The amount of such compounds in a layer is preferably in the range of from 0.1 to 60% by weight, more preferably in the range from 5 to 35% by weight.

In the case of the method of the invention an activating treatment can be applied prior to the application of an anticorrosion layer, paint layer and/or paintlike polymer-containing layer, preferably an activation based on titanium.

In the case of the method of the invention the application of an anticorrosion layer, paint layer or paintlike polymer-containing layer may be followed by application of an afterrinse and/or passivation, preferably an after-rinse solution based on rare earth compounds, complex fluorides, silanes, titanium compounds and/or zirconium compounds and/or a passivating solution based on rare earth compounds, complex fluorides, silanes, titanium compounds and/or zirconium compounds.

In the case of the method of the invention at least one of the liquids, solutions or suspensions for at least one of the anticorrosion layers, paint layers and/or paintlike polymer-containing layers may comprise an organic film former which, following application to the metallic substrate, is cured by heat and/or actinic radiation, in particular by electrons, UV and/or radiation in the visible light region.

In the case of the method of the invention at least one of the anticorrosion layers, paint layers and/or paintlike polymer-containing layers may be only partly cured prior to adhesive bonding, welding, and/or forming and not fully cured until after adhesive bonding, welding and/or forming, the first curing before adhesive bonding, welding and/or forming taking place by actinic radiation—in particular by electrons, UV and/or radiation in the visible light region—and the second curing taking place after adhesive bonding, welding and/or forming, preferably thermally, in particular by radiant heat and/or hot air. The first cure takes place preferably nonthermally, in particular by UV radiation, since there are normally no ovens for heating present in the metal strip line, in particular in the strip galavanizing line. The second cure preferably takes place thermally, especially when the metal sheet is to be after cured at the same time. The second cure, however, takes place preferably by means of actinic radiation, in particular by UV radiation, since this is often accompanied by better through-curing than by means of thermal crosslinking alone. Furthermore, it is also possible to utilize more than one type of cure in each of the curing steps. For the sake of simplicity, actinic radiation is referred to in this specification as UV radiation and the associated cure is termed UV curing.

In the case of the method of the invention, the liquid, solution or suspension for at least one of the anticorrosion layers, paint layers and/or paintlike polymer-containing layers may have a pH in the range from 0.5 to 12, preferably in the range from to 1 to 11, more preferably in the range from 2 to 10.

In the case of the method of the invention, the liquid, solution or suspension for at least one of the anticorrosion layers, paint layers and/or paintlike polymer-containing layers may be applied to the respective surface at a temperature in the range from 5 to 95° C., preferably in the range from 5 to 50° C., very preferably in the range from 10 to 40° C.

In this context, the substrate and/or the respective surface may be held during application of the anticorrosion layer(s) at temperatures in the range from 5 to 120° C. In the case of the first coating this may be the metallic surface. The first or second anticorrosion layer or basecoat may be applied preferably in a temperature range from 10 to 50° C.

The coated metallic surface may in this case be dried at a temperature in the range from 20 to 400° C. PMT (peak metal temperature). The first and second anticorrosion layer may be applied preferably in a temperature range of 15 to 100° C., the basecoat in particular in a temperature range from 15 to 270° C.

In the case of the method of the invention the coated strips may be cut up or wound to a coil, where appropriate after cooling to a temperature in the range from 10 to 70° C.

Method of one of the above claims, characterized in that the divided strips, after pressing, cutting and/or punching, are coated in the edge region with a temporarily applied coating to be removed again or with a permanently protecting coating, e.g., at least one coating based on dry lubricant, phosphate, hexa-fluoride, paintlike coating and/or paint.

In the case of the method of the invention the liquid, solution or suspension for at least one of the anticorrosion layers, paint layers and/or paintlike polymer-containing layers can be applied by rolling, flowcoating, knifecoating, spraying, squirting, brushing or dipping and, where appropriate, by subsequent squeezing off with a roll.

In the case of the method of the invention the coating applied in each case with the liquid, solution or suspension for at least one of the anticorrosion layers, paint layers and/or paintlike polymer-containing layers can be adjusted to a layer weight in the range from 0.0005 mg/m$^2$ to 150 g/m$^2$, preferably in the range from 0.0008 mg/m$^2$ to 30 g/m$^2$, more preferably in the range from 0.001 mg/m$^2$ to 10 g/m$^2$, in particular in the range from 1 to 6 g/m$^2$.

In the case of the method of the invention at least one coating of paint or of a paintlike, polymer-containing coating can be applied in each case to the partly or fully cured film, the first paint layer or paintlike polymer-containing layer being able to be composed essentially of primer, a thinly—in the range from 0.1 to 10 µm, preferably in the range from 0.15 to 6 µm,, more preferably in the range from 0.2 to 4 µm—organically applied, polymer-containing material (called a permanent coating), a reaction primer, a shop primer or a wash primer. For the purposes of this specification a reaction primer is a primer such as, for example, a coil coating primer, a primer as replacement for the cathodic dip coat, or a welding primer.

In the case of the method of the invention it is possible to apply in each case at least one coating of paint, a mixture of or with polymers, varnish, adhesive and/or adhesive backing to the at least partly painted strip or the strip at least partly coated in a paintlike manner with a polymer-containing layer, or to the at least partly painted strip section or the strip section coated at least partly in a paintlike manner with a polymer-containing layer.

In the case of the method of the invention the clean or cleaned and, where appropriate, activated metallic surface may be contacted with the liquid, solution or suspension for one of the anticorrosion layers and at least one film, which where appropriate may also contain particles, may be formed on the metallic surface, which is subsequently dried and, where appropriate, additionally cured, the dried and, where appropriate, also cured film possibly having in each case a thickness in the range from 0.01 to 100 µm, in particular a film with a thickness in the range from 5 up to 50 µm, more preferably in the range from 8 up to 30 µm. Particles which can be used include pigments, especially color pigments or white pigments, metal particles such as zinc particles, fillers of all kinds such as, for example, chalk, oxides such as alumina, talc or silicates, carbon particles, and nanoparticles.

In this context at least one paint layer may be applied as undercoat or one paintlike polymer-containing layer as pretreatment primer, primer, primer as replacement of the cathodic dip coat, lubricating primer, reaction primer, welding primer and/or wash primer, where appropriate instead of an undercoat. The overall paint system may in certain circumstances amount to up to 300 µm, generally up to 120 µm, often up to 90 μm, occasionally up to only 70 μm, if using more than one paint and/or paintlike layer.

In this context, at least one of the paint layers and/or paintlike polymer-containing layers may be cured by heat and/or actinic radiation, in particular by UV radiation.

In the case of the method of the invention the coated strips or strip sections may be subjected to forming, painted, coated with polymers such as PVC, for example, printed, bonded, hot soldered, welded and/or joined with one another or with other elements by clinching or other joining techniques.

In the case of the coating of metallic strip the production sequence may be that specified below, which indicates by way of example the sequence for steel sheets which are to be galvanized. This manufacturing sequence, where appropriate omitting the coating with a metal or with an alloy such as in the case of galvanizing, may also be transferred to other metallic substrates and used in the same way.

Table 1: Manufacturing Sequence Variants in the Coating of Steel Sheet Which is to be Galvanized 1. Electrolytic cleaning with a strong alkaline cleaner to clean the surface entirely of organic impurities such as fat and oil, for example, and of other dirt.
2. Rinsing with water in a rinsing cascade, final zone with fully deionized water.
3. Only in the case of electrolytic galvanizing: acid pickling: spray with water containing sulfuric acid, with a pH of 1 to 2.
4. Galvanizing: hot-dip galvanizing by dipping in melt bath or electrolytic galvanizing by dipping in a bath containing an aqueous zinc solution: coating with industrial-purity zinc, which may contain certain impurities, particularly of aluminum and lead (HDG); coating with a relatively iron-rich or aluminum-rich zinc alloy such as Galvanneal®, Galfan® or Galvalume®.
5. In the case of electrolytic galvanizing: following the deposition of the galvanizing layer, acidic pickling to remove unevennesses in the galvanizing layer.
6. Especially when phosphate layers are to be applied: coating with an activating solution based in particular on titanium.
7. Optional application of a first anticorrosion layer, e.g., as prephosphating.
8. Optional rinsing with water or, where appropriate, afterrinse solution; after prephosphating, only water.
9. Optional application of a second anticorrosion layer, e.g., an alkaline Fe Co oxide layer.
10. Optional rinsing with water.
11. Optional application of a third anticorrosion layer, e.g., based on hexafluoride.
12. Optional rinsing with water.
13. Optional application of a first paintlike coating.
14. Optional UV irradiation for crosslinking the paintlike coating.
15. Optional heating at temperatures in the range from 50 to 160° C. for thermal crosslinking of the paintlike coating.
16. Optional application of a second paintlike coating, referred to as the paint interlayer.
17. Optional UV irradiation for crosslinking the second paintlike coating.
18. Optional heating at temperatures in the range from 50 to 160° C. for thermal crosslinking of the second paintlike coating.
19. Optional application of a first paint layer as surfacer or topcoat, modified where appropriate with a content of nanoparticles.
20. Optional application of a second paint layer as surfacer or topcoat, modified where appropriate with a content of nanoparticles.
21. Optional application of a third paint layer as topcoat, modified where appropriate with a content of nanoparticles.
22. Optional heating at temperatures in the range from 50 to 160° C. for thermal crosslinking (curing) of the paint layer(s).
23. Optional UV irradiation for crosslinking the final paint layer.

In the table below the abovementioned process steps—by way of example for steel sheet which is to be galvanized—are assigned to the possible manufacturing lines, the specific sequences, and any agents to be used therein. The assignment of particular process steps to the manufacturing line is, however, in each case only one of several possibilities. Manufacturing line Zn=galvanizing line. Manufacturing line CC=coil coating. Manufacturing line bodywork parts manufacture or bodywork manufacture or corresponding manufacturing line in aircraft construction or space travel industry=bod. Z=number of process steps without all possible intermediate steps which may be necessary, such as pickling, cleaning, activating, rinsing or afterrinsing, and/or drying, for example. These method variants apply very substantially in the same way for other metallic materials as well, where appropriate without galvanizing.

TABLES 2A-J

| Variants of the assignment of process steps and manufacturing lines in the case of steel sheet which is to be galvanized, disregarding intermediate steps ||||
| --- | --- | --- | --- |
| Variants A ||||
| Line | Z | Process step | Basis of the principal agents |
| Zn | 1 | galvanizing | zinc, ZnFe, ZnAl |
|  | 2 | pretreatment, rinse or no-rinse, optional afterrinse | chromate, Fe/Co/Ni oxide, free fluoride, complex fluoride, phosphate, phosphonate, rare earths, silane, silicate and/or polymer |
| CC | 3 | optional mild-alkaline cleaning |  |
|  | 4 | chromium-containing or chromium-free pretreatment | chromate, Fe/Co/Ni oxide, free fluoride, complex fluoride, phosphate, phosphonate, rare earths, silane, silicate and/or polymer |
|  | 5 | basecoat | coil coating primer, lubricating or welding primer: UV curing and/or thermosetting |
| CC or bod | 6 | optional paint interlayer |  |
|  | 7 | color coat |  |
|  | 8 | clearcoat, optionally two layers |  |
| bod | 9 | cutting, pressing and/or stamping |  |
|  | 10 | optional (further) forming |  |
|  | 11 | optional joining such as clinching, bonding, for example |  |
|  | 12 | optional clearcoat |  |

TABLES 2A-J-continued

Variants of the assignment of process steps and manufacturing lines in the case of steel sheet which is to be galvanized, disregarding intermediate steps

| Line | Z | Process step | Principal agents |
|---|---|---|---|
| Variants B | | | |
| Zn | 1 | galvanizing | zinc, ZnFe, ZnAl chromate, Fe/Co/Ni oxide, free fluoride, complex fluoride, phosphate, phosphonate, rare earths, silane, silicate and/or polymer |
|  | 2 | pretreatment, rinse or no-rinse, optional afterrinse | |
| CC | 3 | optional mild-alkaline cleaning | |
|  | 4 | basecoat, optionally with pretreatment properties | coil coating primer, lubricating primer or welding primer: UV curing and/or thermosetting; chromate, free fluoride, complex fluoride, phosphate, phosphonate, rare earths, silane, silicate, corrosion inhibitor, pigment, polymer and/or wax |
| CC or bod | 5 | optional paint interlayer | |
|  | 6 | color coat | |
|  | 7 | clearcoat, optionally two layers | |
| bod | 8 | cutting, pressing and/or stamping | |
|  | 9 | optional (further) forming | |
|  | 10 | optional joining such as clinching, bonding, for example | |
|  | 11 | optional clearcoat | |
| Variants C | | | |
| Zn | 1 | galvanizing | zinc, ZnFe, ZnAl chromate, Fe/Co/Ni oxide, free fluoride, complex fluoride, phosphate, phosphonate, rare earths, silane, silicate and/or polymer |
|  | 2 | pretreatment, rinse or no-rinse, optional afterrinse | |
|  | 3 | basecoat, optionally with pretreatment properties | coil coating primer, lubricating primer or welding primer: UV curing and/or thermosetting; chromate, free fluoride, complex fluoride, phosphate, phosphonate, rare earths, silane, silicate, corrosion inhibitor, pigment, polymer and/or wax |
| Zn* | 4 | optional paint interlayer | |
| CC or bod | 5 | color coat | |
|  | 6 | clearcoat, optionally two layers | |
| bod | 7 | cutting, pressing and/or stamping | |
|  | 8 | optional (further) forming | |
|  | 9 | optional joining such as clinching, bonding, for example | |
|  | 10 | optional clearcoat | |

*where appropriate, alternatively on CC or bod

| Line | Z | Process step | Principal agents |
|---|---|---|---|
| Variants D | | | |
| Zn | 1 | galvanizing | zinc, ZnFe, ZnAl chromate, Fe/Co/Ni oxide, free fluoride, complex fluoride, phosphate, phosphonate, rare earths, silane, silicate and/or polymer |
|  | 2 | pretreatment, rinse or no-rinse, optional afterrinse | |
| Zn or CC | 3 | basecoat, optionally with pretreatment properties | coil coating primer, lubricating primer or welding primer: UV curing and/or thermosetting; chromate, free fluoride, complex fluoride, phosphate, phosphonate, rare earths, silane, silicate, corrosion inhibitor, pigment, polymer and/or wax |
| CC or bod | 4 | optional paint interlayer | |
|  | 5 | color coat | |
|  | 6 | clearcoat, optionally two layers | |
| bod | 7 | cutting, pressing and/or stamping | |
|  | 8 | optional (further) forming | |
|  | 9 | optional joining such as clinching, bonding, for example | |
|  | 10 | optional clearcoat | |
| Variants E | | | |
| Zn | 1 | galvanizing | zinc, ZnFe, ZnAl coil coating primer, lubricating primer or welding primer: UV curing and/or thermosetting; chromate, free fluoride, complex fluoride, phosphate, phosphonate, rare earths, silane, silicate, corrosion inhibitor, pigment, polymer and/or wax |
|  | 2 | basecoat with pretreatment properties | |
| Zn* | 3 | optional paint interlayer | |
| CC or bod | 4 | color coat | |
|  | 5 | clearcoat, optionally two layers | |
| bod | 6 | cutting, pressing and/or stamping | |
|  | 7 | optional (further) forming | |
|  | 8 | optional joining such as clinching, bonding, for example | |
|  | 9 | optional clearcoat | |

*where appropriate, alternatively on CC or bod

| Line | Z | Process step | Principal agents |
|---|---|---|---|
| Variants F | | | |
| Zn | 1 | galvanizing | zinc, ZnFe, ZnAl coil coating primer, lubricating primer or welding primer: UV |
|  | 2 | basecoat with pretreatment properties, preferably | |

TABLES 2A-J-continued

Variants of the assignment of process steps and manufacturing lines in the case of steel sheet which is to be galvanized, disregarding intermediate steps

|  |  | UV-curing | curing and/or thermosetting; chromate, free fluoride, complex fluoride, phosphate, phosphonate, rare earths, silane, silicate, corrosion inhibitor, pigment, polymer and/or wax |
|---|---|---|---|
| Zn* | 3 | optional paint interlayer |  |
| CC or bod | 4 | color coat, preferably UV-curing |  |
|  | 5 | clearcoat, preferably UV-curing |  |
| bod | 6 | cutting, pressing and/or stamping |  |
|  | 7 | optional (further) forming |  |
|  | 8 | optional joining such as clinching, bonding, for example |  |
|  | 9 | optional clearcoat, preferably UV-curing |  |

*where appropriate, alternatively on CC or bod

Variants G

| Zn | 1 | galvanizing | zinc, ZnFe, ZnAl |
|---|---|---|---|
|  | 2 | pretreatment, rinse or no-rinse, optional afterrinse | chromate, Fe/Co/Ni oxide, free fluoride, complex fluoride, phosphate, phosphonate, rare earths, silane, silicate and/or polymer |
|  | 3 | basecoat, optionally with pretreatment properties, preferably UV-curing | coil coating primer, lubricating primer or welding primer: UV curing and/or thermosetting; chromate, free fluoride, complex fluoride, phosphate, phosphonate, rare earths, silane, silicate, corrosion inhibitor, pigment, polymer and/or wax |
| Zn* | 4 | optional paint interlayer |  |
| bod | 5 | cutting, pressing and/or stamping |  |
|  | 6 | optional (further) forming |  |
|  | 7 | optional joining such as clinching, bonding, welding |  |
|  | 8 | color coat, preferably UV-curing |  |
|  | 9 | clearcoat, optionally two layers, preferably UV-curing |  |

*where appropriate, alternatively on CC or bod

Variants H

| Zn | 1 | galvanizing | zinc, ZnFe, ZnAl |
|---|---|---|---|
|  | 2 | basecoat with pretreatment properties, preferably UV-curing | coil coating primer, lubricating primer or welding primer: UV curing and/or thermosetting; chromate, free fluoride, complex fluoride, phosphate, phosphonate, rare earths, silane, silicate, corrosion inhibitor, pigment, polymer and/or wax |
| Zn* | 3 | optional paint interlayer |  |
| bod | 4 | cutting, pressing and/or stamping |  |
|  | 5 | optional (further) forming |  |
|  | 6 | optional joining such as clinching, bonding, welding |  |
|  | 7 | color coat, preferably UV-curing |  |
|  | 8 | clearcoat, optionally two layers, preferably UV-curing |  |

*where appropriate, alternatively on CC or bod

Variants J

| Zn | 1 | galvanizing | zinc, ZnFe, ZnAl |
|---|---|---|---|
|  | 2 | basecoat with pretreatment properties | coil coating primer, lubricating primer or welding primer: UV curing and/or thermosetting; chromate, free fluoride, complex fluoride, phosphate, phosphonate, rare earths, silane, silicate, corrosion inhibitor, pigment, polymer and/or wax |
| CC* | 3 | optional paint interlayer |  |
|  | 4 | color coat, possibly UV-curing |  |
| bod | 5 | cutting, pressing and/or stamping |  |
|  | 6 | optional (further) forming |  |
|  | 7 | optional joining such as clinching, bonding, welding |  |
|  | 8 | clearcoat, optionally two layers, possibly UV-curing |  |

*could also run on other manufacturing lines such as Zn or bod

The table below illustrates which metallic substrates or metallic coatings are coated onto substrates with at least one anticorrosion layer and/or with at least one paintlike coating, and which composition the anticorrosion layer preferably possesses in this case.

TABLE 3

Correlation between preferred chemical bases of anticorrosion layers or corresponding pretreatment solutions with metallic substrate or metallic coating on a substrate, respectively: goes very well: ⊕, good: x, possible: •. 1., 2., and 3. show different coatings following one another.

| Chem. basis of individual anticorrosion layers and/or their baths | Al/Al alloy | Mg alloy | iron/steel | Stainless steel | Zn | Zn alloy, AlZn alloy |
|---|---|---|---|---|---|---|
| Oxalate | • | • | • | ⊕ | • | • |
| 1. oxalate, 2. chromate | • | • | • | ⊕ | • | • |
| 1. oxalate, 2. polymer afterrinse solution | • | • | • | ⊕ | • | • |
| 1. Fe/Co oxide, 2. AlZrF$_6$ | | • | | | ⊕ | ⊕ |
| Ti and/or Zr hexafluoride | ⊕ | x | ⊕ | x | ⊕ | ⊕ |
| Ti and/or Zr hexafluoride with SiO$_2$ | ⊕ | • | ⊕ | x | ⊕ | ⊕ |
| 1. Ti and/or Zr hexafluoride, 2. silane(s) | ⊕ | x | ⊕ | • | ⊕ | ⊕ |
| 1. Ti and/or Zr hexafluoride, 2. Mn phosphate | ⊕ | • | ⊕ | • | ⊕ | ⊕ |
| 1. Ti and/or Zr hexafluoride, 2. phosphonate(s) | ⊕ | ⊕ | • | • | • | • |
| 1. Ti and/or Zr hexafluoride, 2. phosphonate(s), 3. silane(s) | ⊕ | ⊕ | ⊕ | • | x | x |
| Rare earth element(s) as nitrate(s) | ⊕ | • | | | | |
| Rare earth element (s) with Bi, peroxide and chloride | ⊕ | • | • | | • | • |
| Al phosphate | x | • | x | x | x | x |
| Fe phosphate | x | • | x | x | x | x |
| Mn phosphate | ⊕ | • | ⊕ | • | ⊕ | ⊕ |
| Zn phosphate | ⊕ | • | ⊕ | • | ⊕ | ⊕ |
| ZnMn phosphate | ⊕ | • | ⊕ | • | ⊕ | ⊕ |
| MnZn phosphate | ⊕ | • | ⊕ | x | ⊕ | ⊕ |
| 1. phosphate, 2. chromate afterrinse solution | ⊕ | x | ⊕ | • | ⊕ | ⊕ |
| 1. phosphate, 2. Ti/ZrF$_6$ afterrinse solution | ⊕ | x | ⊕ | • | ⊕ | ⊕ |
| 1. phosphate, 2. polymer afterrinse solution | ⊕ | • | ⊕ | • | ⊕ | ⊕ |
| Zn/Mn phosphate with polymer and Ti/ZrF$_6$ | x | • | ⊕ | • | ⊕ | ⊕ |
| Zn/Mn phosphate with polymer, Ti/ZrF$_6$, and nanoparticle | x | • | ⊕ | • | ⊕ | ⊕ |
| Polymer | • | • | • | • | • | • |
| Polymer with lubricant | x | • | x | x | x | x |
| Polymer with nanoparticle* | ⊕-• | ⊕-• | ⊕-• | ⊕-• | ⊕-• | ⊕-• |
| Polymer with lubricant and nanoparticle* | ⊕ | ⊕ | ⊕ | ⊕-x | ⊕ | ⊕ |
| Polymer with lubricant, corrosion inhibitor, and nanoparticle | ⊕ | ⊕ | ⊕ | ⊕-x | ⊕ | ⊕ |
| Polymer with lubricant, complex fluoride, corrosion inhibitor, and nanoparticle | ⊕ | ⊕-• | ⊕ | ⊕-x | ⊕ | ⊕ |
| Polymer with lubricant, complex fluoride, corrosion inhibitor, nanoparticle, and phosphate | ⊕ | ⊕-• | ⊕ | ⊕-x | ⊕ | ⊕ |

TABLE 3-continued

Correlation between preferred chemical bases
of anticorrosion layers or corresponding pretreatment
solutions with metallic substrate or metallic coating
on a substrate, respectively: goes very well: ⊕,
good: x, possible: •. 1., 2., and 3. show different
coatings following one another.

| Chem. basis of individual anticorrosion layers and/or their baths | Al/ Al alloy | Mg alloy | iron/ steel | Stainless steel | Zn | Zn alloy, AlZn alloy |
|---|---|---|---|---|---|---|
| Phosphonate | ⊕ | x |  |  | x | x |
| Silane (s)/siloxane (s) | ⊕ | x | ⊕ | • | ⊕ | ⊕ |
| Silane with Ti/ZrF$_6$ | ⊕ | x | ⊕ |  | ⊕ | ⊕ | in the case of phosphate contents: where appropriate with addition of nickel
*depending on polymer content and nanoparticle content, very good especially in the case where at least one corrosion inhibitor and/or crosslinking agent is/are present The method of the invention is particularly advantageous since in the short term at least some and in the medium term all of the chemical and coatings technology operating steps can be moved from the automobile plant to the steelworks or aluminum/magnesium mill. There, these sections of the method can run on high-speed manufacturing lines, in particular on strip lines, and so can be utilized with a time saving, much more uniformly, more environmentally friendly, with savings of chemicals, water, space, energy, and costs, and with higher quality. Correspondingly, the costs of the pretreated, painted and, where appropriate, formed parts are much lower per fabricated square meter of the coated surface. Lower quantities of sludge are obtained in this process than in the case of the mode of manufacturing to date, especially during pretreatment and painting. Indeed, the baths in question have much lower volumes. Instead of about 20 to 250 m$^3$, a typical bath volume is now only 5 to 15 m$^3$. While pretreatment and painting take place at present in a large automobile plant usually with 3000 to 5000 m$^2$/h, a throughput of about 8000 to 30 000 m$^2$/h can be achieved on strip lines. The overall time for cleaning and pretreatment can be lowered from 20 to 40 minutes to 15 to 30 seconds. The weight of the pretreatment coating can in some cases be lowered from 1.5 to 4 g/m$^2$ to about 0.01 to 2 g/m$^2$. The chemical consumption in the pretreatment can be lowered from 20 to 40 g/m$^2$ to 1 to 10 g/m$^2$. Instead of 15 to 40 g of sludge per m$^2$ of coated surface, now only 0 to 6 g per m$^2$ are produced. The painting and baking time can be reduced from 120 to 180 minutes to 0.1 to 2 minutes—for 2 layers of paint in each case. The paint consumption falls, for 3 paint layers with 200 to 300 g/m$^2$, to 80 to 120 g/m$^2$ for 2 paint layers. The overall costs could fall approximately by from 5 to 20% of the present overall costs per m$^2$ of coated surface.

It was surprising that with a synthetic resin coating according to the invention, despite a thickness of only about 0.2 µm, it was possible to produce an extremely high-quality chromium-free film which produces extraordinarily firm adhesion of paint to the coating of the invention. Furthermore, it was surprising that the addition of finely divided particles resulted in a significant improvement in the adhesive strength of the paint; an improvement in the corrosion resistance could have been hoped for as a result of the incorporation of the inorganic particles, but an improvement in the paint adhesion strength was unforeseeable.

If paint layers or paintlike layers can be applied on the strip and not as part of the parts or bodywork manufacturing operation, the costs as compared with parts or bodywork manufacturing can be lowered significantly. Consequently, manufacturing on a strip, such as on a coil coating line in the parts manufacture or bodywork manufacture operation, is to be preferred.

EXAMPLES

The examples described hereinbelow are intended to illustrate the subject matter of the invention. The recorded concentrations and compositions relate to the treatment solution itself and not to any more highly concentrated batch solutions that may be used. All concentration figures are to be understood as solids fractions; that is, the concentrations relate to the weight fractions of the effective components irrespective of whether the raw materials used were in dilute form, e.g., as aqueous solutions. In addition to the compositions set out below it may be necessary or desirable in commercial practice to add further additives or to adapt the amounts correspondingly: for example, either to raise the total amount of additions or, for example, to raise the amount of the defoamer and/or of the leveling agent such as a polysiloxane, for example.

Synthetic resins used were a styrene acrylate having a glass transition temperature in the range from 15 to 25° C. and having an average particle size in the range from 120 to 180 nm, an acrylic-polyester-polyurethane copolymer having a blocking point in the range from 140 to 180° C. and a glass transition temperature in the range from 20 to 60° C., an ethylene-acrylic copolymer having a melting point in the range from 70 to 90° C., and an acrylic-modified carboxyl-containing polyester in particular having a number of OH groups in the range from 80 to 120 and having an acid number in the range from 50 to 90, calculated based on the solid resin, and also with a hardening off—for example, by addition of hexamethoxymethylmelamine with an acid number less than 5. The styrene-butadiene copolymer has a glass transition temperature in the range from −20 to +20° C. and an acid number of from 5 to 30; because of the presence of carboxyl groups this copolymer is additionally crosslinkable, for example, with melamine resins or with isocyanate-containing polymers. The copolymer based on epoxide acrylate has an acid number in the range from 10 to 18 and a glass transition temperature of between 25 and 40° C. This copolymer for the coating in particular of steel gives the coating of the invention a higher chemical stability, in particular in the basic range, and improves the adhesion properties with respect to the metallic substrate.

The fumed silica has a BET value in the range from 90 to 130 m²/g, the colloidal silica an average particle size in the range from 10 to 20 nm. The melamine-formaldehyde was used with a crosslinking partner for the carboxyl-containing polyester resin. The oxidized polyethylene served as a lubricant and forming agent (wax) and had a melting point in the range from 125 to 165° C. The polysiloxane used was a polyether modified dimethylpolysiloxane and served as wetting and flow agent for the wet film during application. As a combination of silanes with functional and nonfunctional character, a mixture of hydrolyzed silanes based on 1,2-bis(triethoxysilyl)ethane and aminopropyltriethoxysilane is used. The defoamer was a mixture of hydrocarbons, hydrophobic silica, oxalated compounds, and nonionogenic emulsifiers. As a long-chain alcohol, a tripropylene glycol mono-n-butyl ether was used for film forming. The ammonium zirconium carbonate serves as crosslinking agent. As corrosion inhibitor, one based on a TPA-amine complex was used. As chromate additive, ammonium dichromate was chosen in certain cases.

A) (Pre-)Treatment of Galvalume® Steel Sheets:

Inventive Example 1

Steel sheets obtained from commercial cold-rolled and subsequently alloy-galvanized steel strip with 55% AlZn (Galvalume®), which for protection purposes were oiled during storage, were first of all degreased in an alkaline spray cleaner, rinsed with water, dried at elevated temperature, and then treated with the aqueous composition of the invention. A defined amount of the aqueous composition (bath solution) was applied by means of a rollcoater so as to give a wet film thickness of about 10 ml/m². The wet film was subsequently dried at temperatures in the range from 80 to 100° C. PMT, filmed, and cured. The composition of the bath solution is set out in Table 4.

The constituents were mixed in the order stated and the pH of the solution was subsequently adjusted to 8.2 by means of ammonia solution. Following application, the solution was dried in a forced air oven at about 90° C. PMT (peak metal temperature). The steel sheets treated in this way were subsequently tested for their corrosion control and their mechanical properties.

Inventive Examples 2 to 13, 15 to 20, and 30, and Comparative Examples 14, 1, 2 and 4

Alloy-zinc steel sheets were treated as described in example 1 with the aqueous composition set out in Table 4 and were dried and tested. In the case of example 9, drying was carried out at 180° C. PMT. In the case of comparative example 14, no inorganic compound in particle form was added. In the case of inventive example 30, the composition corresponds to that of inventive example 11 apart from the absence of wax. In the case of comparative example 4, steel sheets alloy-galvanized on the basis of Galvalume® without subsequent treatment were used, for the purpose of comparison with inventive examples 1 to 20.

TABLE 4

Composition of the bath liquids of all inventive and comparative examples:

| | Amount in parts by weight/example | | | | | | | | | | |
|---|---|---|---|---|---|---|---|---|---|---|---|
| | I 1 | I 2 | I 3 | I 4 | I 5 | I 6 | I 7 | I 8 | I 9 | I 10 | I 11 |
| Water | 100 | 100 | 100 | 100 | 100 | 100 | 100 | 100 | 100 | 100 | 100 |
| Styrene acrylate | 6.40 | 6.40 | | | | 1.00 | 1.00 | 1.00 | | 2.00 | 1.80 |
| Acrylic-polyester-polyurethane copolymer | | | 6.40 | 3.40 | 3.00 | 2.40 | 3.70 | 3.90 | | 2.70 | 2.60 |
| Ethylene-acrylic copolymer | | | | 3.00 | 3.00 | 3.00 | 3.00 | 1.50 | 1.00 | 2.70 | 2.60 |
| Carboxyl-containing polyester | | | | | | | | | 5.70 | | |
| Melamine-formaldehyde | | | | | | | | | 0.60 | | |
| Colloidal SiO₂ 10-20 nm | | 2.50 | 2.50 | 2.50 | 2.50 | 2.50 | 1.25 | 2.50 | 1.60 | 1.50 | 1.40 |
| Fumed silica | 2.50 | | | | | | | | | | |
| Oxidized polyethylene | 0.50 | 0.50 | 0.50 | 0.50 | 0.50 | 0.50 | 0.50 | 0.50 | 0.50 | 0.50 | 0.50 |
| Polysiloxane | 0.10 | 0.10 | 0.10 | 0.10 | 0.10 | 0.10 | 0.10 | 0.10 | 0.10 | 0.10 | 0.10 |
| Combination of silanes | | | | | 0.40 | | | | | | |
| Defoamer | 0.10 | 0.10 | 0.10 | 0.10 | 0.10 | 0.10 | 0.10 | 0.10 | 0.10 | 0.10 | 0.10 |
| Long-chain alcohol | 0.40 | 0.40 | 0.40 | 0.40 | 0.40 | 0.40 | 0.40 | 0.40 | 0.40 | 0.40 | 0.40 |
| Ammonium Zr carbonate | | | | | | | | | | | 0.40 |
| TPA-amine complex | | | | | | | | | | | 0.10 |

| | Amount in parts by weight/example | | | | | | | | | | |
|---|---|---|---|---|---|---|---|---|---|---|---|
| | I 12 | I 13 | C 14 | I 15 | I 16 | I 17 | I 18 | I 19 | I 20 | C 1 | C 2 |
| Water | 100 | 100 | 100 | 100 | 100 | 100 | 100 | 100 | 100 | 100 | 100 |
| Styrene acrylate | 4.40 | | 2.22 | 2.00 | 1.82 | 1.68 | 1.56 | 1.70 | 1.70 | 4.50 | 4.38 |
| Acrylic-polyester-polyurethane copolymer | | 4.40 | 3.09 | 2.80 | 2.56 | 2.35 | 2.18 | 2.60 | 2.53 | 4.40 | 4.28 |
| Ethylene-acrylic copolymer | 2.60 | 2.60 | 3.09 | 2.80 | 2.56 | 2.35 | 2.18 | 2.60 | 2.53 | | |
| Carboxyl-containing polyester | | | | | | | | | | | |
| Melamine-formaldehyde | | | | | | | | | | | |
| Colloidal SiO₂ 10-20 nm | 1.40 | 1.40 | | 0.80 | 1.46 | 2.02 | 2.48 | 1.40 | 1.40 | | |
| Fumed silica | | | | | | | | | | | |
| Oxidized polyethylene | 0.50 | 0.50 | 0.50 | 0.50 | 0.50 | 0.50 | 0.50 | 0.50 | 0.50 | 0.50 | 0.50 |
| Polysiloxane | 0.10 | 0.10 | 0.10 | 0.10 | 0.10 | 0.10 | 0.10 | 0.10 | 0.10 | 0.10 | 0.10 |

TABLE 4-continued

Composition of the bath liquids of all inventive and comparative examples:

| | | | | | | | | | | | |
|---|---|---|---|---|---|---|---|---|---|---|---|
| Combination of silanes | | | | | | | | | | | |
| Defoamer | 0.10 | 0.10 | 0.10 | 0.10 | 0.10 | 0.10 | 0.10 | 0.10 | 0.10 | 0.10 | 0.10 |
| Long-chain alcohol | 0.40 | 0.40 | 0.40 | 0.40 | 0.40 | 0.40 | 0.40 | 0.40 | 0.40 | 0.40 | 0.40 |
| Ammonium Zr carbonate | 0.40 | 0.40 | 0.40 | 0.40 | 0.40 | 0.40 | 0.40 | 0.40 | 0.40 | | |
| TPA-amine complex | 0.10 | 0.10 | 0.10 | 0.10 | 0.10 | 0.10 | 0.10 | 0.10 | 0.10 | | |
| Ammonium dichromate | | | | | | | | 0.10 | 0.24 | | 0.24 |

| | Amount in parts by weight/example | | | | | | | | | | |
|---|---|---|---|---|---|---|---|---|---|---|---|
| | I 30 | I 21 | I 22 | I 23 | I 24 | I 25 | I 26 | I 27 | I 28 | I 29 | C 9 |
| Water | 100 | 100 | 100 | 100 | 100 | 100 | 100 | 100 | 100 | 100 | 100 |
| Styrene acrylate | 1.89 | 2.00 | 1.90 | 1.60 | 1.45 | 1.70 | | | | 1.80 | 4.38 |
| Acrylic-polyester-polyurethane copolymer | 2.74 | 2.70 | 2.70 | 2.65 | 2.45 | 2.55 | | | | 2.60 | 4.28 |
| Ethylene-acrylic copolymer | 2.74 | 2.70 | 2.65 | 2.65 | 2.45 | 2.55 | 2.65 | 2.65 | 2.65 | 2.60 | |
| Carboxyl-containing styrene-butadiene copolymer | | | | | | | | | 2.15 | | |
| Carboxyl-containing polyester | | | | | | | 4.25 | | | | |
| Melamine-formaldehyde | | | | | | | | | | | |
| Epoxide-acrylate copolymer | | | | | | | | 4.25 | 2.10 | | |
| Colloidal SiO$_2$ 10-20 nm | 1.47 | 1.40 | 1.37 | 1.32 | 1.27 | 1.28 | 1.32 | 1.321 | 1.32 | 1.40 | |
| Fumed silica | | | | | | | | | | | |
| Oxidized polyethylene | 0.50 | 0.50 | 0.50 | 0.50 | 0.50 | 0.50 | 0.50 | 0.50 | 0.50 | 0.50 | 0.50 |
| Polysiloxane | 0.11 | 0.10 | 0.10 | 0.10 | 0.10 | 0.10 | 0.10 | 0.10 | 0.10 | 0.10 | 0.10 |
| Combination of silanes | | | | | | | | | | | |
| Defoamer | 0.11 | 0.10 | 0.10 | 0.10 | 0.10 | 0.10 | 0.10 | 0.10 | 0.10 | 0.10 | 0.10 |
| Long-chain alcohol | 0.42 | 0.40 | 0.40 | 0.40 | 0.40 | 0.40 | 0.40 | 0.40 | 0.40 | 0.40 | 0.40 |
| Ammonium Zr carbonate | 0.42 | | | | 0.40 | | | | | 0.40 | |
| TPA-amine complex | 0.11 | 0.10 | 0.28 | 0.48 | 0.68 | 0.88 | 0.48 | 0.48 | 0.48 | 0.10 | |
| Ammonium dichromate | | | | | | | | | | | 0.24 |

Results of the Tests on Galvalume® Sheets:

The dry layer add-on of the dried, filmed, cured, and, where appropriate, also thermally cured polymer-containing coatings gave for all of the experiments—except in the case of comparative example 4—in each case values in the range from 900 to 1100 mg/m². The dried films had a thickness in the range from 0.8 to 1 μm. All coatings according to the invention with the exception of example 1 were transparent and colorless and showed a slight silky luster, so that the optical character of the metallic surface remained visible with virtually no change. In the case of example 1, the coating was milky white with a fairly pronounced dulling effect.

TABLE 5

Results of the corrosion control tests

| | Salt spray test ASTM B117-73 areal corrosion after 480 h in % | Salt spray test ASTM B117-73 edge corrosion after 480 h in mm | Constant condensation conditions test DIN 50 017 CC areal corrosion after >1680 h in % | Stacking test areal corrosion after 28 days in % | Stacking test edge corrosion after 28 days in mm |
|---|---|---|---|---|---|
| I 1 | <50 | 30 | 20 | 100 | fully corroded |
| I 2 | 40 | 30 | 20 | 100 | fully corroded |
| I 3 | 40 | 30 | 20 | 100 | fully corroded |
| I 4 | 20 | 20 | 0 | 50 | fully corroded |
| I 5 | 20 | 20 | 0 | 40 | 20 |
| I 6 | 20 | 20 | 0 | 40 | 20 |
| I 7 | 20 | 20 | 0 | 40 | 20 |
| I 8 | 15 | 20 | 0 | 30 | 20 |
| I 9 | 5 | 30 | 0 | 0 | 5 |
| I 10 | 20 | 20 | 0 | 30 | 5 |
| I 11 | 0 | 12 | 0 | 0 | 2 |
| I 12 | 0 | 12 | 0 | 0 | 2 |
| I 13 | 0 | 12 | 0 | 0 | 2 |
| C 14 | 100 | fully corroded | 0 | 30 | fully corroded |
| I 15 | 5 | 16 | 0 | 30 | 5 |
| I 16 | 0 | 12 | 0 | 0 | 2 |
| I 17 | 5 | 16 | 0 | 10 | 5 |
| I 18 | 20 | 16 | 0 | 20 | 5 |
| I 19 | 0 | 12 | 0 | 0 | 0 |
| I 20 | 0 | 12 | 0 | 0 | 0 |
| C 1 | 90 | 30 | 20 | 100 | fully corroded |
| C 2 | 0 | 20 | 0 | 0 | 0 |
| I 30 | 0 | 12 | 0 | 0 | 2 |
| C 4 | 100 | fully corroded | 100 | 100 | fully corroded |

In the case of comparative example 14 and inventive examples 15 to 18 the amount of colloidal silica was raised continuously from zero. In the course of the corrosion tests it was found that an amount of about 1.46 parts by weight of colloidal silica in the case of example 16 gave the best corrosion control for this test series (Table 5).

Using the composition of example 16, Galvalume® sheets were coated with a film thickness of the dried coating of the invention of about 1 g/m² and were dried at different temperatures. These sheets were then subjected to a salt spray test in accordance with ASTM B 117-73 (Table 6).

TABLE 6

Results for example 16 on Galvalume ® sheets dried at different temperatures

| Drying temperature | Salt spray test ASTM B117-73 areal corrosion after 72 h in % | Salt spray test ASTM B117-73 areal corrosion after 240 h in % | Salt spray test ASTM B117-73 areal corrosion after 480 h in % | Salt spray test ASTM B117-73 areal corrosion after 720 h in % |
|---|---|---|---|---|
| 20° C. | 0.5 | 10 | 10 | 10 |
| 40° C. | 0.5 | 10 | 10 | 10 |
| 60° C. | 0 | 2.5 | 5 | 5 |
| 80° C. | 0 | 0 | 0 | 5 |
| 100° C. | 0 | 0 | 0 | 2.5 |
| 120° C. | 0 | 0 | 0 | 2.5 |

For method variants in the case of the particularly good example 16 it was found that the temperature for drying the aqueous composition on Galvalume® sheet should be at least about 60° C. in order to provide particularly good results in terms of corrosion control. With increased temperature, better film formation and crosslinking is achieved.

TABLE 7

Results of mechanical tests

| | König pendulum hardness, to DIN 53 157 | Mandrel bending test with conical mandrel from 3.2 mm to 38 mm in diameter, to DIN ISO 6860 | Erichsen cupping test |
|---|---|---|---|
| I 1 | 60 | cracks < 1.5 mm | unaffected |
| I 2 | 80 | cracks < 1.5 mm | unaffected |
| I 3 | 60 | no cracks | unaffected |
| I 4 | 60 | no cracks | unaffected |
| I 5 | 60 | no cracks | unaffected |
| I 6 | 60 | no cracks | unaffected |
| I 7 | 70 | no cracks | unaffected |
| I 8 | 80 | no cracks | unaffected |
| I 9 | 120 | no cracks | unaffected |
| I 10 | 60 | no cracks | unaffected |
| I 11 | 60 | no cracks | unaffected |
| I 12 | 60 | no cracks | unaffected |
| I 13 | 80 | no cracks | unaffected |
| C 14 | 40 | no cracks | unaffected |
| I 15 | 50 | no cracks | unaffected |
| I 16 | 60 | no cracks | unaffected |
| I 17 | 60 | no cracks | unaffected |
| I 18 | 60 | no cracks | unaffected |
| I 19 | 60 | no cracks | unaffected |
| I 20 | 60 | no cracks | unaffected |
| C 1 | 60 | no cracks | unaffected |
| C 2 | 60 | no cracks | unaffected |
| I 30 | 60 | no cracks | cracked, abrasion |
| C 4 | inapplicable | inapplicable | cracked, abrasion:worse than C 3 |

The smallest values in the corrosion tests of Tables 5 and 6 indicate the best results. The results of the tests of Table 7 also show marked differences between the different polymeric coatings, especially in the stacking test. The best coatings according to the invention are at least equal to the chromate-containing coatings in terms of areal corrosion resistance. However, in the case of addition of chromate as well to the coatings according to the invention, the edge corrosion may also be regarded as at least equal to that of the chromate-containing products known to date.

The test known as the stacking test may serve, among other things, to test for formation of rust. With this accelerated test it is possible to assess the corrosion control, for example, of treated strip surfaces with regard to the influence of a hot moist atmosphere, such as may occur, for example, during storage or transport through different climatic zones of a wound strip (i.e., a coil). For this purpose, in each case 8 or 10 test sheets treated on both sides with the treatment liquid and dried are cut in 80×80 mm format, for example using impact shears. The cut edges remain unprotected and untreated. The sheets must be planar and are stacked horizontally in such a way that the flash of the cut edges points in one direction. Using a burette, 1 ml of DI water per 100 cm² of surface area is applied to the respective substrate surface between the metal sheets. The stack of sheets is then packed watertight in PE film and welded shut, so that the DI water cannot evaporate or escape during the test. The sheet stack packed in this way is stored in a test chamber to DIN 50 017 CC for a test period of 4 weeks. An assessment is then made as to what kind of rust (red rust, black rust, white rust) has developed in the edge region and what percentage area is affected by the rust. An assessment is also made as to what kind of rust has developed over the entire surface area and of how great the percentage corroded area fraction on the treated sheet surface is. Galvalume® sheets in this test exhibit first white or black corrosion and, like steel, if the aluminum-zinc alloy coating has been consumed or has been damaged right through to the steel sheet, exhibit red corrosion.

The pendulum hardness was averaged over 5 measurements in each case, the values being rounded up or down accordingly. The lower the pendulum hardness, the softer the film and also, usually, the better the adhesion of the film to the metallic surface. However, cross-cut results, which might characterize the adhesion, are not particularly informative in the case of such thin films. In the case of comparative example 14 in connection with inventive examples 15 to 18, an increase in hardness is apparent owing to the addition of SiO₂ particles.

The ductile properties of the coating of the invention were set so that the coating is neither too soft nor too hard for the mechanical attack of the tools during forming. As a result, a substantially undamaged coating remains after the forming operation. Moreover, as a result of these ductile properties, the cut edges are relatively well protected, since the coating does not fragment at the cut edges and in some cases is even drawn up at the cut edge, so that increased edge protection is achieved. Fragmentation of the coating of the invention during the production of metal sheet sections would cause contamination of the forming tools, which can lead to unwanted markings on the surfaces of the metal sheets in the course of the operating steps which follow the shaping operation. As a result of the optimized ductile behavior, surprisingly, a slip behavior and friction behavior was achieved which does not have very low values to start with and then a very rapid increase in the slip coefficient and friction coefficients, but instead allows extraordinarily long low levels of slip and friction during different operations following forming.

The mandrel bending test is evidence of the good flexibility and good adhesion of the coating to the metallic substrate, and of its outstanding formability.

Forming was carried out with a cup-drawing machine from Erichsen, model 142-20, with a sheet holder force of 2500 kp and with a drawing force of 2 Mp. From the Galvalume® sheet sections treated in accordance with the invention, disks of 60 mm in diameter were punched, and were drawn to hat-shaped cups with a brim generally about 15 to 17 mm in depth and with a cup diameter of about 35 mm. Without the addition of a lubricant and/or forming agent such as wax, there was damage to the aluminum-zinc spangle in the regions of the internal radii of the cups, in some cases with extremely severe metallic abrasion. Adding even a small amount of a lubricant and/or forming agent prevented this surface damage, and the brim (disk) was drawn together to diameters in the region of about 48 mm. Without the addition of a lubricant and/or forming agent forming was adversely affected in that the brim (disk) reduced its diameter to a lesser extent than with said addition, for instance, to diameters only in the region of about 58 mm. This diameter is partly also dependent on the time at which a crack appeared and the time of the associated machine shutoff. At that point, the cups had generally been drawn only to a depth of 5 to 10 mm. Additionally, without the addition of a lubricant and/or forming agent, there was always a crack, generally a very long crack, in the region of the external radius of the cup, as a result of which the middle deep-drawn area of the cup stood up steeply to one side, as in the case of a partly opened can. In the case of comparative example 14, in relation to examples 15 to 18, there was no difference in the visual extent of the drawn cups in terms of the large external diameter, of shape development, and of surface development. Nor did wetting of the surface with a copper sulfate solution, so that a reaction surface reddish brown to black in color could form at defects in the organic coating, owing to the reaction of the zinc coating with the copper sulfate, indicate any differences between cups with a different $SiO_2$ particle content. The good forming properties therefore appear to derive from the presence of organic substance, especially oxidized polyethylene, and are positively influenced by the presence of inorganic particles.

Metal sheets such as those coated in inventive example 11 were dried further at different temperature PMT, namely at room temperature for 72 hours, at 40° C., 60° C., 80° C., 100° C. or 120° C. for 5 minutes in each case, and thereafter at room temperature for at least 70 hours. No difference was apparent in the visible extent of the drawn cups in terms of the large external diameter, of shape development, and of surface development, even after wetting with copper sulfate. In the case of the salt spray test, however, it was found that, with the substrate sections treated in accordance with inventive example 11 which had been dried at a temperature of 20° C., 40° C. or 60° C. the corrosion control achievable was no more than satisfactory, albeit improving with increasing temperature. The corrosion control afforded by the substrate sections treated with inventive example 11 and dried at a temperature of 80° C., 100° C. or 120° C. was found to be good and even, with increasing temperature, very good.

It is anticipated that the experiments performed on Galvalume® sheets and the results determined can be transferred to sheets provided with AlSi, ZnAl, ZnFe, ZnNi, Al, and Zn coatings without changing the process parameters and lead to virtually identical results.

B) Treatment of Cold-rolled Steel (CRS):

In the case of inventive examples 21 to 28 and with reference to comparative examples 5 to 8, the text below addresses 1. the increasing fraction of the corrosion inhibitor (examples 21 to 25),
2. examples 26 and 28 for styrene-butadiene copolymers as film formers,
3. examples 27 and 28 for epoxide copolymers as film formers,
4. comparative examples 5 to 8 for steel in the untreated, oiled, alkali-phosphated or zinc-phosphated state.

In comparison to examples 1 to 20 of Galvalume® sheets, examples 21 to 28 below are specifically intended for the pretreatment prior to painting or for the treatment in each case of cold-rolled steel (CRS). The objective is, as compared with the hitherto customary oiling of the steel surfaces as temporary corrosion control, to use a corrosion-protectingly pretreated steel surface which, unlike the oil film, need no longer be removed before subsequent painting and as a result provides possibly considerable advantages in terms of the environmental burden: the disposal of the corrosion control oil from the cleaning-product baths which are normally used prior to subsequent painting is largely or completely unnecessary as a result, if indeed it has not already been possible to do without these cleaning operations entirely, since the surfaces have not been soiled and/or have not been oiled during transport, storage and/or further processing of the metallic substrates.

As a primer-integrated pretreatment for producing painted surfaces of cold-rolled steel, the method of the invention is of economic importance: in accordance with the invention, a corrosion-protecting treatment of the steel surface is proposed which initially offers corrosion control during transport, storage, and further processing of the steel surface and which subsequently is part of the overall paint system. Accordingly, success has been achieved in developing a pretreatment primer for steel.

Inventive Example 21

Steel sheets obtained from commercial cold-rolled steel strip of grade ST 1405, which had been oiled for the purpose of protection during storage, were first degreased in an alkaline spray cleaner, rinsed with water, dried at elevated temperature, and then treated with the aqueous composition of the invention. A defined amount of the aqueous composition (bath solution) was applied by means of a rollcoater so as to give a wet film thickness of about 10 ml/m². The wet film was subsequently dried at a temperature in the range from 80 to 100° C. PMT, filmed, and cured. The bath liquid had the composition indicated in Table 4.

Inventive Examples 22 to 28

As described in example 21, steel sheets were treated with the treatment liquid set out in Table 4, dried, and tested.

Comparative Example 5

Steel sheets of grade ST 1405 without corrosion control treatment were subjected to a condensation cycling test to DIN 50 017 KFW (see Table 8).

Comparative Example 6

Steel sheets of grade ST 1405 were treated with a commercial mill oil. They were then subjected to a condensation cycling test to DIN 50 017 KFW (see Table 8).

Comparative Example 7

Steel sheets obtained from commercial cold-rolled steel strip of grade ST 1405, which had been oiled for the purpose of protection during storage, were first degreased in an alkaline spray cleaner, rinsed with water, dried at elevated temperature, and then treated with the commercial alkali phosphating system Unibond® WH, giving a thickness of about 0.3 µm. They were then subjected to a condensation cycling-test to DIN 50 017 KFW (see Table 8).

Comparative Example 8

Steel sheets obtained from commercial cold-rolled steel strip of grade ST 1405, which had been oiled for the purpose of protection during storage, were first degreased in an alkaline spray cleaner, rinsed with water, dried at elevated temperature, and then treated with the commercial tricationic zinc phosphating system Gardobond® 101, such as is in use in general industry, giving a thickness of about 1.5 µm. They were then subjected to a condensation cycling test to DIN 50 017 KFW (see Table 8).

Results of the Tests on Treated Cold-rolled Steel:

The films of the polymer-containing coatings of the invention, dried and thermally cured in the course of drying, showed a thickness in the range from 0.8 to 1 µm. The coating of comparative examples 7 and 8 exhibited a thickness of about 0.3 and 1.5 µm respectively. All coatings according to the invention were transparent and colorless and exhibited a slight silky gloss, so that the optical character of the metallic surface remained visible with virtually no alteration.

TABLE 8

Results of the corrosion control tests of examples 21 to 28 and of comparative examples 5 to 8

| Condensation cycling test to DIN 50 017 JFW | Areal corrosion after 1 cycle in % | Areal corrosion after 3 cycles in % | Areal corrosion after 5 cycles in % | Areal corrosion after 7 cycles in % | Areal corrosion after 10 cycles in % |
|---|---|---|---|---|---|
| I 21 | 0 | 0 | 5 | 15 | 20 |
| I 22 | 0 | 0 | 2 | 10 | 15 |
| I 23 | 0 | 0 | 0 | 2 | 5 |
| I 24 | 0 | 0 | 0 | 0 | 0 |
| I 25 | 0 | 0 | 0 | 0 | 0 |
| I 26 | 0 | 0 | 0 | 0 | 0 |
| I 27 | 0 | 0 | 0 | 0 | 0 |
| I 28 | 0 | 0 | 0 | 0 | 0 |
| C 5 | 80 | 100 | not applicable | not applicable | not applicable |
| C 6 | 5 | 20 | 30 | 40 | 60 |
| C 7 | 30 | 70 | 100 | not applicable | not applicable |
| C 8 | 20 | 30 | 60 | 100 | not applicable |

TABLE 9

Results of the mechanical tests:

| | König pendulum hardness to DIN 53 157 | Mandrel bending test with conical mandrel from 3.2 mm to 38 mm in diameter, to DIN ISO 6860 | Erichsen cupping test |
|---|---|---|---|
| I 21 | 60 | no cracks | unaffected |
| I 22 | 60 | no cracks | unaffected |
| I 23 | 60 | no cracks | unaffected |
| I 24 | 60 | no cracks | unaffected |
| I 25 | 60 | no cracks | unaffected |
| I 26 | 50 | no cracks | unaffected |
| I 27 | 70 | no cracks | unaffected |
| I 28 | 55 | no cracks | unaffected |

The results of the experiments of inventive examples 21 to 25 show that an increased fraction of corrosion inhibitor brings about a perceptible improvement in corrosion control. From examples 26 to 28 it is clear that the addition of acrylate-epoxide copolymer or of styrene-butadiene copolymer instead of styrene acrylate or acrylic-polyester-polyurethane copolymer, respectively, brings about improved adhesion to the substrate and an increased chemical resistance, particularly toward alkaline substances. In this context it was found that the corrosion resistance gives good or equally good results above a minimum level of at least one corrosion inhibitor. The coatings of the inventive examples 21 to 28 are outstandingly suitable for the forming of cold-rolled steel. The comparative examples 5 to 8 did not need testing in this context, since their coatings are completely unsuitable for forming operations.

In comparison with the oiled substrate surface without conventional corrosion control layer (C 6) and also in comparison to the so-called non-film-forming pre-treatment layer or film-forming pretreatment layer such as, for example, by means of alkali phosphating (C 7) or zinc phosphating (C 8), in which the pretreated sheets are subsequently overpainted, the coatings of the invention have the advantage in particular that an entirely adequate to satisfactory corrosion control can be ensured by the protective layer of the invention on surface regions difficult to access, or to access completely, during painting if, for example, strip is coated in accordance with the invention and only then is formed and, where appropriate, subsequently painted. In comparison to the oiled substrate surface without a conventional corrosion protection layer and also in comparison to the so-called non-film-forming pre-treatment layer or film-forming pretreatment layer such as, for example, by alkali phosphating or zinc phosphating, which require overpainting, the method of the invention also has the advantage of ensuring satisfactory corrosion control even without painting, e.g., in the case of architectural metal sheets in interior situations or in protected situations without relatively high humidity, e.g., installed under the roof.

The coatings corresponding to examples 21 to 28 are highly suitable as a pretreatment layer prior to painting or a treatment layer for cold-rolled steel (CRS), which after an appropriate storage time is processed further into shaped parts and then painted or which is processed to components without subsequent painting in interior situations and is therefore not exposed to the stresses which are usual as a result of outdoor weathering.

Owing to the synthetic resin combination with a high fraction of epoxide-acrylate copolymer or styrene-butadiene copolymer, in outdoor situations the coating corresponding to inventive examples 26 to 28 is suitable only as a pretreatment prior to subsequent coating and not as long-term bright corrosion control in outdoor situations, since this coating is not sufficiently stable to the kind of UV radiation exposure experienced in the course of outdoor weathering. In interior situations these coatings can be used, only where there is very low humidity, as a treatment without subsequent paint.

It is very surprising that, for use on particularly corrosion-sensitive surfaces such as steel, for example, it was possible to develop a polymer-containing coating which has an aqueous basis, which is free from or contains a relatively small amount of organic solvents, which is able to dry, film, and normally undergo at least partial crosslinking at low temperature—below 120° C. PMT, in particular in the range from 60 to 80° C. PMT—and rapidly—in the case of strip lines, within a period of 1 to 3 s or, in the case of parts coating by dipping, owing to the run-off edges, within a time of 5 to 10 minutes, in the case of parts spraying in a time of up to 5 minutes—while nevertheless ensuring effective corrosion resistance. Preferably, such coatings of the invention on steel should have a layer weight of from 0.8 to 2 $g/m^2$, corresponding to a layer thickness in the range approximately from 0.7 to 2.5 µm.

C) (Pre-)Treatment of Magnesium Castings:

Inventive Example 29

Castings in the form of plates with a thickness of about 5 mm, consisting of the magnesium alloys AZ91D and AM50A, on the basis of MgAlZn and MgAlMn respectively, were first degreased in an alkaline spray cleaner, rinsed with water, dried at elevated temperature, and subsequently treated with the aqueous composition of the invention. An amount of the aqueous composition (bath solution) was applied by immersion in the treatment liquid so that the average wet film thickness was about 1 to 1.5 $ml/m^2$. Thereafter the wet film was dried at a temperature in the range from 80 to 100° C. PMT, filmed, and cured. The bath solution had the composition in accordance with Table 4.

Comparative Example 9

In comparison to example 29 the composition of comparative example 2 (see Table 4) was applied by the method of example 29 to plates of the same magnesium alloys.

Results of the Tests on Magnesium Castings:

TABLE 10

Results of the corrosion control tests

| Salt spray test ASTM B117-73 | Salt spray test ASTM B117-73 | Salt spray test ASTM B117-73 | Salt spray test ASTM B117-73 | Constant condensation climate test DIN 50 017 |
| --- | --- | --- | --- | --- |
| areal corrosion after 120 h in % | areal corrosion after 240 h in % | areal corrosion after 480 h in % | edge corrosion after 480 h in mm | CC areal corrosion after 240 h in % |
| I 29  0 | 10 | 20 | 0 | 0 |
| C 9   0 | 10 | 20 | 0 | 0 |

The determination of pendulum hardness of the coating according to the invention gave values of 60. Since, with a few exceptions, magnesium alloys cannot be subjected to deep-drawing, it was not possible to carry out the mandrel bending test. The films of the polymer-containing coatings of the invention, dried and thermally cured in the course of drying, showed an average thickness of about 1.2 µm. The coating of comparative example 9 had an average thickness of about 1.2 µm. The coating of the invention was transparent and colorless and exhibited a slight silky gloss, so that the optical character of the metallic surface remained visible with virtually no alteration. The chromium-free coating of the invention was equal in terms of corrosion resistance to a coating containing chromium and polymer.

D) (Pre-)Treatment of Galvalume® Steel Sheets and of Galvanized Steel Sheets in Chromium-Free Multilayer Systems:

Inventive Example 30

Steel sheets which, starting from commercial cold-rolled steel strip, were alloy-galvanized by coating with 55% AlZn (Galvalume®) or hot galvanized by immersion in zinc melt (HDG), and which thereafter were oiled for the purpose of protection during storage, and cut, were first of all degreased in an alkaline spray cleaner, rinsed with water, dried at elevated temperature, and then treated with a first aqueous composition. Both types of steel sheet were investigated in parallel during this experiment and during the related experiments. A defined amount of the aqueous composition (bath solution) was applied by means of a rollcoater so as to give a wet film thickness of 10 $ml/m^2$. At temperatures in the range from 80 to 100° C. PMT the wet film was subsequently dried, filmed, and cured. The composition of the first bath solution is given in Table 11.

Subsequently, after cooling to room temperature, a second treatment was carried out with a second, inventive aqueous composition. In this case, a defined amount of the aqueous composition of the invention (bath solution) was applied with the aid of a rollcoater so as to give a wet film thickness of about 10 $ml/m^2$. Thereafter, at temperatures in the range from 80 to 100° C. PMT the wet film was dried, filmed, and cured. The composition of the second bath solution is given in Table 11.

TABLE 11

Composition of the bath liquids of all inventive and comparative examples:

| | Example Amount in parts by weight | | | | | |
| --- | --- | --- | --- | --- | --- | --- |
| | I 30 | I 31 | I 32 | I 33 | I 34 | I 35 |
| Composition of the bath solution for treatment 1 | | | | | | |
| Water | 100 | 100 | 100 | 100 | 100 | 100 |
| Acrylic-polyester-polyurethane copolymer | | | | 0.80 | | 0.80 |
| Ethylene-acrylic copolymer | 0.80 | 1.60 | 1.60 | 0.80 | 0.80 | |
| Colloidal $SiO_2$ 10-20 nm | 0.80 | 1.60 | 1.60 | 1.60 | 1.60 | 1.60 |

TABLE 11-continued

Composition of the bath liquids of all inventive and comparative examples:

| | | | | | | |
|---|---|---|---|---|---|---|
| Polysiloxane | 0.02 | 0.02 | 0.02 | 0.02 | 0.02 | 0.02 |
| Defoamer | 0.02 | 0.02 | 0.02 | 0.02 | 0.02 | 0.02 |
| Ammonium Zr carbonate | | | 0.40 | 0.40 | 0.40 | 0.40 |
| TPA-amine complex | 0.10 | 0.10 | 0.10 | 0.10 | 0.10 | 0.10 |
| Dry film thickness, nm | 160 | 320 | 320 | 320 | 240 | 240 |

Composition of the bath solution for treatment 2

| | | | | | | |
|---|---|---|---|---|---|---|
| Water | 100 | 100 | 100 | 100 | 100 | 100 |
| Styrene acrylate | 1.80 | 1.80 | 1.80 | 1.80 | 1.80 | 1.80 |
| Acrylic-polyester-polyurethane copolymer | 2.60 | 2.60 | 2.60 | 2.60 | 2.60 | 2.60 |
| Ethylene-acrylic copolymer | 2.60 | 2.60 | 2.60 | 2.60 | 2.60 | 2.60 |
| Colloidal $SiO_2$ 10-20 nm | 1.40 | 1.40 | 1.40 | 1.40 | 1.40 | 1.40 |
| Oxidized polyethylene | 0.50 | 0.50 | 0.50 | 0.50 | 0.50 | 0.50 |
| Polysiloxane | 0.10 | 0.10 | 0.10 | 0.10 | 0.10 | 0.10 |
| Defoamer | 0.10 | 0.10 | 0.10 | 0.10 | 0.10 | 0.10 |
| Long-chain alcohol | 0.40 | 0.40 | 0.40 | 0.40 | 0.40 | 0.40 |
| Ammonium Zr carbonate | 0.40 | 0.40 | 0.40 | 0.40 | 0.40 | 0.40 |
| TPA-amine complex | 0.10 | 0.10 | 0.10 | 0.10 | 0.10 | 0.10 |
| Dry film thickness, nm | 1000 | 1000 | 1000 | 1000 | 1000 | 1000 |

| | Example Amount in parts by weight | | | | |
|---|---|---|---|---|---|
| | I 36 | I 37 | I 38 | I 39 | I 40 |

Composition of the bath solution for treatment 1

| | | | | | |
|---|---|---|---|---|---|
| Water | 100 | 100 | 100 | 100 | 100 |
| Silane | 0.80 | 1.60 | 2.40 | | |
| Phosphonates | | | | 0.03 | |
| Mixture based on $ZrF_6$ and polyacrylic acid | | | | | 0.07 |
| Dry film thickness, nm | 80 | 160 | 240 | <80 | 10 |

Composition of the bath solution for treatment 2

| | | | | | |
|---|---|---|---|---|---|
| Water | 100 | 100 | 100 | 100 | 100 |
| Styrene acrylate | 1.80 | 1.80 | 1.80 | 1.80 | 1.80 |
| Acrylic-polyester-polyurethane copolymer | 2.60 | 2.60 | 2.60 | 2.60 | 2.60 |
| Ethylene-acrylic copolymer | 2.60 | 2.60 | 2.60 | 2.60 | 2.60 |
| Colloidal $SiO_2$ 10-20 nm | 1.40 | 1.40 | 1.40 | 1.40 | 1.40 |
| Oxidized polyethylene | 0.50 | 0.50 | 0.50 | 0.50 | 0.50 |
| Polysiloxane | 0.10 | 0.10 | 0.10 | 0.10 | 0.10 |
| Defoamer | 0.10 | 0.10 | 0.10 | 0.10 | 0.10 |
| Long-chain alcohol | 0.40 | 0.40 | 0.40 | 0.40 | 0.40 |
| Ammonium Zr carbonate | 0.40 | 0.40 | 0.40 | 0.40 | 0.40 |
| TPA-amine complex | 0.10 | 0.10 | 0.10 | 0.10 | 0.10 |
| Dry film thickness, nm | 1000 | 1000 | 1000 | 1000 | 1000 |

| | Example Amount in parts by weight | | | | |
|---|---|---|---|---|---|
| | C 10 | I 41 | C 11 | C 12 | C 13 |

Composition of the bath solution for treatment 1

| | | | | | |
|---|---|---|---|---|---|
| Water | 100 | 100 | 100 | 100 | 100 |
| Silane mixture | | | 1.60 | | |
| Phosphonates | | | | 0.03 | |
| Mixture based on $ZrF_6$ and polyacrylic acid | | | | | 0.07 |
| Styrene acrylate | | 1.80 | | | |
| Acrylic-polyester-polyurethane copolymer | 0.80 | 2.60 | | | |
| Ethylene-acrylic copolymer | 0.80 | 2.60 | | | |
| Colloidal $SiO_2$ 10-20 nm | 1.60 | 1.40 | | | |
| Oxidized polyethylene | | 0.50 | | | |
| Polysiloxane | 0.02 | 0.10 | | | |
| Defoamer | 0.02 | 0.10 | | | |
| Long-chain alcohol | | 0.40 | | | |
| Ammonium Zr carbonate | 0.40 | 0.40 | | | |
| TPA-amine complex | | 0.10 | | | |
| Dry film thickness, nm | 320 | 1000 | 160 | 160 | 10 |
| No second treatment | | | | | |

The applied dry film thickness is given approximately in each case.

Inventive Example 31 to 35

Alloy-galvanized or hot-dip-galvanized steel sheets, as described in example 30, were treated with the treatment liquid according to Table 11, dried, and tested.

After cooling to room temperature, a second, inventive treatment was then carried out with the second bath solution corresponding to Table 11, as described in example 30.

Inventive Example 36

Alloy-galvanized or hot-dip-galvanized steel sheets, as described in example 30, were treated with the treatment liquid below, dried, and tested. The bath solution consisted essentially of a mixture of 67% by weight 1,2-bis(triethoxysilyl)ethane and 33% by weight aminopropyltriethoxysilane, to which acetic acid (glacial acetic acid), technical-grade denatured methanol, and demineralized water were added. The silane content of the solution used was 0.8% by weight. The acetic acid served here to adapt the pH, the methanol content to facilitate the hydrolysis of the silanes. The dry film thickness was set by way of the concentration of the solution.

In this case, drying produced a dry film of about 80 nm in thickness. After cooling to room temperature, a second, inventive treatment was then carried out with a second bath solution, as described in example 30.

Inventive Example 37

Alloy-galvanized or hot-dip-galvanized steel sheets, as described in example 30, were treated with the treatment liquid below, dried, and tested. The bath solution consisted essentially of a mixture of 67% by weight 1,2-bis(triethoxysilyl)ethane and 33% by weight aminopropyltriethoxysilane, to which acetic acid (glacial acetic acid), technical-grade denatured methanol, and demineralized water were added. The silane content of the solution used was 1.6% by weight. The acetic acid served here to adapt the pH, the methanol content to facilitate the hydrolysis of the silanes. The dry film thickness was set by way of the concentration of the solution.

In this case, drying produced a dry film of about 160 nm in thickness. After cooling to room temperature, a second, inventive treatment was then carried out with a second bath solution in accordance with Table 11, as described in example 30.

Inventive Example 38

Alloy-galvanized or hot-dip-galvanized steel sheets, as described in example 30, were treated with the treatment liquid below, dried, and tested. The bath solution consisted essentially of a mixture of 67% by weight 1,2-bis(triethoxysilyl)ethane and 33% by weight aminopropyltriethoxysilane, to which acetic acid (glacial acetic acid), technical-grade denatured methanol, and demineralized water were added. The silane content of the solution used was 2.4% by weight. The acetic acid served here to adapt the pH, the methanol content to facilitate the hydrolysis of the silanes. The dry film thickness was set by way of the concentration of the solution.

In this case, drying produced a dry film of about 240 nm in thickness. After cooling to room temperature, a second, inventive treatment was then carried out with a second bath solution in accordance with Table 11, as described in example 30.

Inventive Example 39

Alloy-galvanized or hot-dip-galvanized steel sheets, as described in example 30, were treated with the treatment liquid below, dried, and tested. The bath solution consisted, in addition to deionized water, of phosphonic compounds, with a very high level of compound based on 1,12-dodecane-diphosphonic acid.

In this case, drying produced a dry film of on average less than 80 nm in thickness, in particular of one or a few molecular layers, the phosphonic compounds orienting themselves predominantly perpendicular to the surface. After cooling to room temperature, a second, inventive treatment was then carried out with a second bath solution in accordance with Table 11, as described in example 30.

Inventive Example 40

Alloy-galvanized or hot galvanized steel sheets, as described in example 30, were treated with the treatment liquid specified below, dried, and tested. The bath solution consisted of
  2 g/l hexafluorozirconic acid,
  0.3 g/l Al(OH)$_3$,
  1.8 g/l polyacrylic acid (molecular weight: about 100 000),
  2 g/l SiO$_2$ (as colloidal silica dispersion), and
  1 g/l MnCO$_3$.

After cooling to room temperature, a second, inventive treatment was then carried out with the second bath solution in accordance with Table 11, as described in example 30.

In the case of example 41 and of the comparative examples 11 to 13 only the first treatment was carried out.

Inventive Example 41

Alloy-galvanized or hot galvanized steel sheets, as described in example 30, were treated with the treatment liquid corresponding to Table 11, dried, and tested.

Comparative Example 10

Steel sheets which, starting from commercial cold-rolled steel strip, were alloy-galvanized by coating with 55% AlZn (Galvalume®) or hot dip galvanized by immersion in zinc melt (HDG), and which thereafter were oiled for the purpose of protection during storage, and cut, were first of all degreased in an alkaline spray cleaner, rinsed with water, dried at elevated temperature, and then treated with a first aqueous composition. A defined amount of the aqueous composition (bath solution) was applied by means of a rollcoater so as to give a wet film thickness of 10 ml/m$^2$. At temperatures in the range from 80 to 100° C. PMT the wet film was subsequently dried, filmed, and cured. The bath solution had a composition in accordance with Table 11.

Comparative Example 11

Alloy-galvanized or hot-dip-galvanized steel sheets, as described in example 30, were treated with the treatment liquid below, dried, and tested. The bath solution consisted essentially of a mixture of 67% by weight 1,2-bis(triethoxysilyl)ethane and 33% by weight aminopropyltriethoxysilane, to which acetic acid (glacial acetic acid), technical-grade denatured methanol, and demineralized water were added. The silane content of the solution used was 1.6% by weight. The acetic acid served here to adapt the pH, the methanol content to facilitate the hydrolysis of the silanes. The dry film thickness was set by way of the concentration of the solution. In this case, drying produced a dry film of about 160 nm in thickness.

Comparative Example 12

Alloy-galvanized or hot-dip-galvanized steel sheets, as described in example 30, were treated with the treatment liquid below, dried, and tested. The bath solution consisted, in addition to deionized water, of phosphonic compounds, with a very high level of compound based on 1,12-dodecane-diphosphonic acid. In this case, drying produced a dry film of on average less than 80 nm in thickness, in particular of one or a few molecular layers, the phosphonic compounds orienting themselves predominantly perpendicular to the surface.

Comparative Example 13

Alloy-galvanized or hot-dip-galvanized steel sheets, as described in comparative example 10, were treated with the treatment liquid specified below, dried, and tested. The bath solution consisted of 2 g/l hexafluorozirconic acid, 0.3 g/l Al(OH)$_3$, 1.8 g/l polyacrylic acid (molecular weight: about 100 000), 2 g/l $SiO_2$ (as colloidal silica dispersion), and 1 g/l $MnCO_3$.

Results of the Tests on Galvalume® Sheets and on Hot-dip-Galvanized (HDG) Sheets The dry layer add-on of the dried, filmed, cured, and also, where appropriate, thermally cured, polymer-containing coatings is apparent approximately from Table 11. All coatings according to the invention were transparent and colorless and exhibited a slight silky gloss, so that the optical character of the metallic surface remained visible with no alteration.

TABLE 12

Results of the corrosion control tests on Galvalume ® in salt spray test ASTM B 117-73

| | Areal corrosion after 24 h in % | Areal corrosion after 48 h in % | Areal corrosion after 120 h in % | Areal corrosion after 240 h in % | Areal corrosion after 480 h in % |
|---|---|---|---|---|---|
| I 30 | 0 | 0 | 0 | 0 | 2 |
| I 31 | 0 | 0 | 0 | 0 | 0 |
| I 32 | 0 | 0 | 0 | 0 | 0 |
| I 33 | 0 | 0 | 0 | 0 | 0 |
| I 34 | 0 | 0 | 0 | 0 | 0 |
| I 35 | 0 | 0 | 0 | 0 | 0 |
| I 36 | 0 | 0 | 0 | 0 | 2 |
| I 37 | 0 | 0 | 0 | 0 | 0 |
| I 38 | 0 | 0 | 0 | 0 | 0 |
| I 39 | 0 | 0 | 0 | 0 | 0 |
| I 40 | 0 | 0 | 0 | 0 | 0 |
| C 10 | 2 | 5 | 10 | 15 | 20 |
| I 41 | 0 | 0 | 2 | 2 | 5 |
| C 11 | 5 | 5 | 10 | 10 | 15 |
| C 12 | 10 | 30 | 50 | 100 | not applicable |
| C 13 | 10 | 30 | 50 | 100 | not applicable |

TABLE 13

Results of the corrosion control tests on hot-dip-galvanized steel of grade Z 250 in salt spray test ASTM B 117-73

| | Areal corrosion after 24 h in % | Areal corrosion after 48 h in % | Areal corrosion after 120 h in % | Areal corrosion after 240 h in % | Areal corrosion after 480 h in % |
|---|---|---|---|---|---|
| I 30 | 0 | 0 | 5 | 15 | 30 |
| I 31 | 0 | 0 | 2 | 10 | 20 |
| I 32 | 0 | 0 | 2 | 10 | 20 |
| I 33 | 0 | 0 | 2 | 10 | 20 |
| I 34 | 0 | 0 | 2 | 10 | 20 |
| I 35 | 0 | 0 | 20 | 10 | 20 |
| I 36 | 0 | 0 | 5 | 15 | 30 |
| I 37 | 0 | 0 | 5 | 15 | 30 |
| I 38 | 0 | 0 | 50 | 10 | 20 |
| I 39 | 0 | 0 | 10 | 20 | 30 |
| I 40 | 0 | 0 | 10 | 20 | 30 |
| C 10 | 50 | 100 | not applicable | not applicable | not applicable |
| I 41 | 0 | 2 | 5 | 10 | 40 |
| C 11 | 5 | 5 | 10 | 20 | 50 |
| C 12 | 50 | 100 | not applicable | not applicable | not applicable |
| C13 | 50 | 100 | not applicable | not applicable | not applicable |

TABLE 14

Results of the corrosion control tests constant condensation climate test to DIN 50 017 CC and stacking test on Galvalume ®

| | Constant condensation climate test DIN 50 017 CC areal corrosion after 960 h in % | Constant condensation climate test DIN 50 017 CC areal corrosion after 1920 h in % | Stacking test areal corrosion after 28 days in % | Stacking test edge corrosion after 28 days in mm |
|---|---|---|---|---|
| I 30 | 0 | 10 | 0 | <1 |
| I 31 | 0 | 0 | 0 | <1 |
| I 32 | 0 | 0 | 0 | <1 |
| I 33 | 0 | 0 | 0 | <1 |
| I 34 | 0 | 0 | 0 | <1 |
| I 35 | 0 | 0 | 0 | <1 |
| I 36 | 0 | 10 | 0 | <1 |
| I 37 | 0 | 5 | 0 | <1 |
| I 38 | 0 | 0 | 0 | <1 |
| I 39 | 0 | 0 | 0 | <1 |
| I 40 | 0 | 0 | 0 | <1 |
| C 10 | 10 | 40 | 100 | completely corroded |
| I 41 | 0 | 5 | 0 | 2 |
| C 11 | 10 | 30 | 100 | completely corroded |
| C 12 | 30 | 40 | 100 | completely corroded |
| C 13 | 30 | 40 | 100 | completely corroded |

TABLE 15

Results of the corrosion control tests
constant condensation climate test to DIN 50 017 CC and
stacking test on HDG

| | Constant condensation climate test DIN 50 017 CC areal corrosion after 960 h in % | Constant condensation climate test DIN 50 017 CC areal corrosion after 1920 h in % | Stacking test areal corrosion after 28 days in % | Stacking test edge corrosion after 28 days in mm |
|---|---|---|---|---|
| I 30 | 0 | 10 | <5 | 3 |
| I 31 | 0 | 0 | <2 | <1 |
| I 32 | 0 | 0 | <2 | <1 |
| I 33 | 0 | 0 | <2 | <1 |
| I 34 | 0 | 0 | <2 | <1 |
| I 35 | 0 | 0 | <2 | <1 |
| I 36 | 0 | 10 | <2 | <1 |
| I 37 | 0 | 5 | <2 | <1 |
| I 38 | 0 | 0 | <2 | <1 |
| I 39 | 0 | 0 | <2 | <1 |
| I 40 | 0 | 0 | <2 | <1 |
| C 10 | 10 | 40 | 100 | completely corroded |
| I 41 | 0 | 10 | <5 | 2 |
| C 11 | 10 | 30 | 100 | completely corroded |
| C 12 | 30 | 40 | 100 | completely corroded |
| C 13 | 30 | 40 | 100 | completely corroded |

The smallest values in the corrosion tests of Tables 12 and 15 show the best results. In comparison to examples 30 to 40, comparative examples 10 to 13 show much poorer, and example 41 slightly poorer, corrosion control values of the single-layer surface treatment in comparison to the two-layer surface treatment.

The stacking test was performed as described previously.

The mechanical tests on Galvalume® sheets and, respectively, in the case of HDG took place in a test chamber to DIN 50 017 CC for a test period of 4 weeks. An assessment is then made as to what kind of rust (red rust, black rust, white rust) has developed in the edge region and what percentage area is affected by the rust. An assessment is also made as to what kind of rust has developed over the entire surface area and of how great the percentage corroded area fraction on the treated sheet surface is. Galvalume® sheets in this test exhibit first white or black corrosion and, like steel, if the aluminum-zinc alloy coating has been consumed or has been damaged right through to the steel sheet, exhibit red corrosion. The results were identical for both types of substrate.

TABLE 16

Results of the mechanical tests, tested on
Galvalume® sheets and HDG respectively:

| | König pendulum hardness to DIN 53 157 | Mandrel bending test with conical mandrel from 3.2 mm to 38 mm in diameter, to DIN ISO 6860 | Erichsen cupping test |
|---|---|---|---|
| I 30 | 60 | no cracks | unaffected |
| I 31 | 60 | no cracks | unaffected |
| I 32 | 60 | no cracks | unaffected |
| I 33 | 60 | no cracks | unaffected |
| I 34 | 60 | no cracks | unaffected |
| I 35 | 60 | no cracks | unaffected |
| I 36 | 60 | no cracks | unaffected |
| I 37 | 60 | no cracks | unaffected |
| I 38 | 60 | no cracks | unaffected |
| I 39 | 60 | no cracks | unaffected |
| I 40 | 60 | no cracks | unaffected |
| C 10 | not applicable | cracks | cracked, abrasion |
| I 41 | 60 | no cracks | unaffected |
| C 11 | not applicable | cracks | cracked, abrasion |
| C 12 | not applicable | cracks | cracked, abrasion |
| C 13 | not applicable | cracks | cracked, abrasion |

The pendulum hardness was averaged over 5 measurements in each case, the values being rounded up or down accordingly. The lower the pendulum hardness, the softer the film and also, usually, the better the adhesion of the film to the metallic surface.

The ductile properties of the coating of the invention were set so that the coating is neither too soft nor too hard for the mechanical attack of the tools during forming. As a result, a substantially undamaged coating remains after the forming operation. Moreover, as a result of these ductile properties, the cut edges are relatively well protected, since the coating does not fragment at the cut edges and in some cases is even drawn up at the cut edge, so that increased edge protection is achieved.

The mandrel bending test is evidence of the good flexibility and good adhesion of the coating to the metallic substrate, and of its outstanding formability.

Forming took place as described previously with a cup-drawing machine from Erichsen, model 142-20, with a sheet holder force of 2500 kp and with a drawing force of 2 Mp. From the Galvalume® sheet sections treated in accordance with the invention, disks of 60 mm in diameter were punched, and were drawn to hat-shaped cups with a brim generally about 15 to 17 mm in depth and with a cup diameter of about 35 mm. The good forming properties therefore appear to derive from the presence of organic substance, especially oxidized polyethylene, and are positively influenced by the presence of inorganic particles.

It is anticipated that the experiments performed on Galvalume® sheets and hot-dip-galvanized sheets and the results determined can be transferred to sheets provided with AlSi, ZnAl, ZnFe, ZnNi, Al, and Zn coatings without changing the process parameters and lead to virtually identical results.

The invention claimed is:

1. A method comprising
    coating a metallic section having a metallic surface that does not have an anticorrosive layer formed thereon with at least one layer of a first paint or polymer-containing layer to form a coated metallic section;
    forming the coated metallic section to produce a formed section; coating the formed section with a second paint or polymer-containing layer by applying to the surface of the formed section an aqueous composition which comprises water and a) at least one organic film former comprising at least one water-soluble or water-dispersed polymer having an acid number in the range from 5 to 200, b) at least one particulate inorganic compound, having an average particle diameter, measured in a scanning electron microscope, of from 0.005 up to 0.3 microns and c) at least one lubricant, and drying the second layer to form a particle-containing film on the metallic surface, wherein the dried film has a thickness in the range from 0.01 to 10 microns.

2. The method of claim 1, wherein the metallic surface comprises at least one metal selected from the group consisting of aluminum, iron, copper, magnesium, nickel, titanium, tin, and zinc.

3. The method of claim 1, wherein said aqueous composition is substantially or entirely free from chromium(VI) compounds.

4. The method of claim 3, wherein the aqueous composition is entirely free from chromium (VI) compounds.

5. The method of claim 1, wherein the aqueous composition comprises at least one organic solvent, at least one silane or at least one siloxane.

6. The method of claim 1, wherein the organic film former is provided in the form of a solution, dispersion, emulsion, microemulsion or suspension.

7. The method of claim 1, wherein the organic film former comprises at least one resin that comprises acrylate, ethylene, polyester, polyurethane, silicone polyester, epoxide, phenol, styrene or urea-formaldehyde.

8. The method of claim 1, wherein the organic film former is an addition copolymer comprising acrylate, epoxide, ethylene, urea-formaldehyde, phenol, polyester, polyurethane, styrene or styrene-butadiene.

9. The method of claim 1, wherein the organic film former comprises a polymer that comprises acrylate, epoxide, phenol, polyethyleneimine, polyurethane, polyvinyl alcohol, polyvinylphenol, polyvinylpyrrolidone or polyaspartic acid.

10. The method of claim 1, wherein the organic film former has a pH of from 1 to 12.

11. The method of claim 1, wherein the organic film former comprises a water-soluble resin.

12. The method of claim 1, wherein the organic film former contains carboxyl groups.

13. The method of claim 1, wherein the film former comprises acid groups that have been stabilized with ammonia.

14. The method of claim 1, wherein the aqueous composition contains from 0.1 to 1000 g/L of the organic film former.

15. The method of claim 1, wherein the aqueous composition comprises at least one partly hydrolyzed or completely hydrolyzed silane.

16. The method of claim 1, wherein the aqueous composition comprises at least one aminosilane, at least one epoxysilane, at least one vinylsilane or at least one corresponding siloxane.

17. The method of claim 1, wherein the aqueous composition comprises from 0.1 to 50 g/L of silane or siloxane, calculated as silane.

18. The method of claim 1, wherein the inorganic compound is provided as a finely divided powder, a dispersion or a suspension.

19. The method of claim 1, wherein the inorganic compound has an average particle size of from 8 nm to 150 nm.

20. The method of claim 1, wherein the inorganic compound comprises at least one compound that comprises at least one of aluminum, barium, cerium, calcium, lanthanum, silicon, titanium, yttrium, zinc or zirconium.

21. The method of claim 1, wherein the inorganic compound comprises alumina, barium sulfate, cerium dioxide, silica, silicate, titanium oxide, yttrium oxide, zinc oxide or zirconium oxide.

22. The method of claim 1, wherein the aqueous composition comprises from 0.1 to 500 g/L of the inorganic compound.

23. The method of claim 1, wherein the aqueous composition comprises at least one corrosion inhibitor.

24. The method of claim 1, wherein the aqueous composition comprises at least one crosslinking agent.

25. The method of claim 1, wherein the aqueous composition is free from inorganic acids or organic carboxylic acids.

26. The method of claim 1, wherein the aqueous composition comprises an organic solvent for the organic polymers.

27. The method of claim 26, wherein the organic solvent is present in an amount of from 0.1 to 10% by weight.

28. The method of claim 1, wherein the aqueous composition comprises at least one wax selected from the group consisting of a paraffin, a polyethylene, a polypropylene and an oxidized wax.

29. The method of claim 28, wherein the melting point of the wax is from 40 to 160° C.

30. The method of claim 1, wherein the aqueous composition comprises a conductive polymer.

31. The method of claim 1, wherein the aqueous composition comprises at least one photoinitiator to allow curing by exposure to actinic radiation.

32. The method of claim 1, wherein the coating is cured by actinic radiation.

33. The method of claim 1, wherein the aqueous composition comprises at least one of a biocide, defoamer or wetting agent.

34. The method of claim 1, wherein the aqueous composition has a pH in the range from 6 to 10.5.

35. The method of claim 1, wherein the aqueous composition is applied to the metallic surface at a temperature in the range from 5 to 50° C.

36. The method of claim 1, wherein the metallic surface is maintained at a temperature of from 5 to 120° C. when coated with the aqueous composition.

37. The method of claim 1, wherein the coated metallic surface is dried at a temperature in the range from 20 to 400° C. peak metal temperature (PMT).

38. The method of claim 1, wherein the coated surface is cooled to a temperature in the range from 40 to 70° C. after application of the aqueous composition.

39. The method of claim 1, wherein the aqueous composition is applied by rolling, flowcoating, knifecoating, spraying, squirting, brushing or dipping.

40. The method of claim 1, wherein the dried film has a pendulum hardness of from 30 to 190 s, measured with a König pendulum hardness tester in accordance with DIN 53157.

41. The method of claim 1, wherein the dried film has a flexibility such that bending over a conical mandrel in a mandrel bending test very substantially in accordance with DIN ISO 6860 for a mandrel of from 3.2 mm to 38 mm in diameter, but without scoring of the test area, produces no cracks longer than 2 mm which are perceptible when subsequently wetted with copper sulfate as a result of color change as a consequence of copper deposition on the cracked metallic surface.

42. The method of claim 1, further comprising applying at least one varnish, adhesive or adhesive backing to the dried film.

43. The method of claim 1, whereon the coated metallic surface is coated with PVC.

44. The method of claim 1, wherein the sections joined to another shaped part.

45. The method of claim 1 wherein the metallic surface comprises at least one of aluminum, iron, cobalt, copper, magnesium, nickel, titanium, tin or zinc or alloys comprising aluminum, iron, cobalt, copper, magnesium, nickel, titanium, tin or zinc.

46. The method of claim 1, wherein the aqueous composition is substantially or entirely free from chromium compounds.

47. The method of claim 1, wherein the aqueous composition comprises a synthetic resin whose acid number is in the range from 5 to 250.

48. The method of claim 2, wherein the aqueous composition comprises from 0.1 to 500 g/L of a synthetic resin.

49. The method of claim 3, wherein the organic film former has a pH of from 6 to 10.5.

50. The method of claim 1, wherein the organic film former is water-soluble.

51. The method of claim 1, wherein the organic film former comprises a synthetic resin, polymer, copolymer, block copolymer, crosspolymer, monomer, or oligomer having a carboxyl group.

52. The method of claim 1, wherein the organic film former comprises a monomer that contains an acid group.

53. The method of claim 1, wherein the aqueous solution comprises from 0.1 to 200 g/L of the organic film former.

54. The method of claim 1, wherein the aqueous composition comprises from 100 to 2000 g/L of the organic film former.

55. The method of claim 1, wherein the aqueous solution comprises a monomer fraction of at least 5% by weight.

56. The method of claim 1, wherein the aqueous composition comprises from 0.1 to 50 g/L of cations.

57. The method of claim 1, wherein the aqueous solution comprises at least one organometallic compound.

58. The method of claim 1, the aqueous composition includes at least one silane or siloxane calculated as silane in a range from 0.2 to 40 g/L.

59. The method of claim 1, wherein the aqueous composition comprises at least one partly hydrolyzed silane, at least one wholly hydrolyzed silane or at least one siloxane.

60. The method of claim 1, wherein the aqueous composition comprises at least one partly hydrolyzed or nonhydrolyzed and has a silane content of more than 100 g/L.

61. The method of claim 1, wherein the aqueous composition comprises at least one acyloxysilane, alkylsilane, aminosilane, bissilylsilane, epoxysilane, fluoroalkylsilane, glycidyloxysilane, isocyanatosilane, mercaptosilane, (meth)acrylatosilane, mono-silyl-silane, multi-silyl-silane, sulfur-containing silane, ureidosilane, vinylsilane or at least one corresponding siloxane.

62. The method of claim 1, wherein the inorganic compound comprises a carbonate, oxide, silicate or sulfate.

63. The method of claim 62, wherein the inorganic compound comprises least one compound of selected from the group consisting of aluminum, barium, cerium, calcium, lanthanum, silicon, titanium, yttrium, zinc and zirconium.

64. The method of claim 1, wherein the aqueous composition comprises from 0.1 to 300 g/L of the inorganic compound.

65. The method of claim 1, wherein the aqueous solution contains an organic solvent.

66. The method of claim 1, wherein the aqueous composition comprises an organic solvent in an amount in the range from 0.1 to 10% by weight.

67. The method of claim 2, wherein the aqueous composition comprises at least one wax selected from the group consisting of a paraffin, a polyethylene, a polypropylene, and an oxidized wax.

68. The method of claim 1, wherein the aqueous composition comprises a wax lubricant whose melting point is in the range from 40 to 160° C.

69. The method of claim 1, wherein the aqueous composition comprises at least one rare earth element.

70. The method of claim 1, wherein the aqueous composition comprises cerium.

71. The method of claim 1, wherein the aqueous composition comprises at least one oxidizing agent.

72. The method of claim 1, wherein the aqueous composition comprises an additive selected from the group consisting of organic binders, biocides, defoamers, corrosion inhibitors, adhesion promoters, wetting agents, photoinitiators, and polymerization inhibitors.

73. The method of claim 1, wherein the aqueous composition comprises a filler, a pigment, or an electrically conductive pigment.

74. The method of claim 1, wherein an additional paint layer is applied to the surface.

75. The method of claim 1, wherein the aqueous composition comprises at least one compound selected from the group consisting of:

a mono-silane of the formula $SiX_mY_{4-m}$ wherein m is from 1 to 3, wherein X is alkoxy, and wherein Y is a functional organic group selected from the group consisting of acyloxy, alkyl, acrylate, amino, epoxy, fluoroalkyl, glycidyloxy, urea, isocyanate, mercapto, methacrylate or vinyl or derivatives thereof, a bis-silane of the formula $Y_{3-p}X_p$—Si-Z-Si—$X_nY_{3-n}$ wherein p and n are from 1 to 3, and are identical or different, wherein X is as defined above; and wherein Y is as defined above, wherein Z is selected from the group consisting of formula $C_nH_{2n}$ which is branched or unbranched and wherein n is from 2 to 20, a singly unsaturated branched or unbranched alkyl chain of the formula $C_nH_{2n-2}$ wherein n is from 2 to 20, a branched or unbranched doubly or multiply unsaturated alkyl compound of the formula $C_nH_{2n-4}$ wherein n is from to 20, formula $C_nH_{2n-6}$ wherein n is from 6 to 20 and which is branched or unbranched, $C_2H_{2n-8}$ wherein n is from 8 to 20 and is branched or unbranched, a ketone, a monoalkylamine, NH, and sulfur $S_q$ wherein q is from 1 to 20;

a multi silane of formula $Y_{3-p}X_p$—Si-Z'-Si—$X_nY_{3-n}$, wherein p and n are as defined above;

wherein X is as defined above, and wherein Y is as defined above, and Z' is N—Si—$X_rY_{3-r}$ wherein r is from 1 to 3 or sulfur $S_q$ wherein q is as defined above;

a multi-silane of formula $Y_{3-p}X_p$—Si-Z"-Si—$X_nY_{3-n}$, wherein p and n are as defined above, wherein X is as defined above, and wherein Y is as defined above, and wherein Z" is —R—C[(SiX$_s$Y$_{3-s}$)(SiX$_t$Y$_{3-t}$)]—R'— or sulfur S$_q$ wherein q is as defioned above;

wherein s and t are from 1 to 3, and are identical or different, with R and R' are identical or different and are selected from the group consisting of formula C$_n$H$_{2n}$ wherein n is from 2 to 20 and is branched or unbranched, of a singly unsaturated branched or unbranched alkyl chain of the formula C$_n$H$_{2n-2}$ wherein n is from 2 to 20, of a branched or unbranched doubly or multiply unsaturated alkyl compound of formula C$_n$H$_{2n-4}$ wherein n is from 4 to 20, formula C$_n$H$_{n-6}$ wherein n is from 6 to 20 and is branched or unbranched, formula C$_n$H$_{2-n}$ wherein n is from 8 to 20 and is branched or unbranched, a ketone, a monoalkylamine and NH.

76. The method of claim 75, wherein X is methoxy, ethoxy or propoxy.

77. The method of claim 75, wherein the silane is hydrolyzed, partly hydrolyzed or nonhydrolyzed form and is in the form of a solution, emulsion or suspension.

* * * * *

UNITED STATES PATENT AND TRADEMARK OFFICE
CERTIFICATE OF CORRECTION

PATENT NO. : 7,615,257 B2 Page 1 of 1
APPLICATION NO. : 10/362403
DATED : November 10, 2009
INVENTOR(S) : Jung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 856 days.

Signed and Sealed this

Nineteenth Day of October, 2010

David J. Kappos
*Director of the United States Patent and Trademark Office*